US012604269B2

(12) United States Patent
Si

(10) Patent No.: US 12,604,269 B2
(45) Date of Patent: Apr. 14, 2026

(54) TRANSMITTING AND RECEIVING LOW POWER SIGNALS

(71) Applicant: Samsung Electronics Co., Ltd., Suwon-si (KR)

(72) Inventor: Hongbo Si, Allen, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 240 days.

(21) Appl. No.: 18/532,929

(22) Filed: Dec. 7, 2023

(65) Prior Publication Data

US 2024/0205826 A1 Jun. 20, 2024

Related U.S. Application Data

(60) Provisional application No. 63/434,359, filed on Dec. 21, 2022, provisional application No. 63/433,939, filed on Dec. 20, 2022.

(51) Int. Cl.
*H04W 52/02* (2009.01)
*H04L 5/00* (2006.01)

(52) U.S. Cl.
CPC ....... *H04W 52/0229* (2013.01); *H04L 5/0048* (2013.01)

(58) Field of Classification Search
None
See application file for complete search history.

(56) References Cited

U.S. PATENT DOCUMENTS

| | | | |
|---|---|---|---|
| 9,872,252 B1 * | 1/2018 | Ang ...................... | H04W 72/20 |
| 2016/0150474 A1 | 5/2016 | Ang et al. | |
| 2021/0195529 A1 | 6/2021 | Yang et al. | |
| 2022/0150852 A1 | 5/2022 | Astrom et al. | |
| 2024/0114449 A1 * | 4/2024 | Elshafie ........... | H04W 52/0225 |

FOREIGN PATENT DOCUMENTS

WO 2022029039 A1 2/2022

OTHER PUBLICATIONS

"3rd Generation Partnership Project; Technical Specification Group Radio Access Network; NR; Physical channels and modulation (Release 17)", 3GPP TS 38.211 V17.1.0, Mar. 2022, 135 pages.
"3rd Generation Partnership Project; Technical Specification Group Radio Access Network; NR; Multiplexing and channel coding (Release 17)", 3GPP TS 38.212 V17.1.0, Mar. 2022, 197 pages.

(Continued)

*Primary Examiner* — Hong S Cho

(57) ABSTRACT

Apparatuses and methods for transmitting and receiving low power signals. A method of a user equipment (UE) in a wireless communication system includes receiving configurations for occasions to receive first and second types of low power signals and determining, based on the configurations, a first set of periodic occasions to receive the first type of low power signal and a second set of non-periodic occasions to receive the second type of low power signal. The method further includes receiving the first type of low power signal and the second type of low power signal and performing, based on the first type of low power signal, at least one of a synchronization measurement and a radio resource management (RRM) measurement.

20 Claims, 27 Drawing Sheets

(56)     References Cited

OTHER PUBLICATIONS

"3rd Generation Partnership Project; Technical Specification Group Radio Access Network; NR; Physical layer procedures for control (Release 17)", 3GPP TS 38.213 V17.1.0, Mar. 2022, 245 pages.

"3rd Generation Partnership Project; Technical Specification Group Radio Access Network; NR; Physical layer procedures for data (Release 17)", 3GPP TS 38.214 V17.1.0, Mar. 2022, 225 pages.

"5G; NR; Radio Resource Control (RRC); Protocol specification (3GPP TS 38.331 version 17.1.0 Release 17)", ETSI TS 138 331 V17.1.0, Aug. 2022, 1257 pages.

International Search Report and Written Opinion issued Apr. 8, 2024 regarding International Application No. PCT/KR2023/021040, 8 pages.

Qualcomm Incorporated, "L1 signal design and procedures for LP-WUR", 3GPP TSG RAN1 Meeting #111, R1-2212144, Nov. 2022, 13 pages.

TCL, "L1 signal design and procedure for low power WUS", 3GPP TSG RAN WG1 Meeting # 111 meeting, R1-2211068, Nov. 2022, 6 pages.

Extended European Search Report dated Feb. 19, 2026, in connection with European Application No. 23907704.3, 8 pages.

* cited by examiner

1900

1901

A UE receives a set of configurations for LP-SYNC and/or LP-WUS

1902

The UE performs measurement based on the LP-SYNC

1903

The UE receives the LP-WUS

1904

The UE identifies a wake-up indication based on the LP-WUS

1905

The UE wakes up the MR

2300

2301

A UE receives a set of configurations for LP-WUS in system information using the MR

2302

The UE determines the LP-WUS is QCLed with a SS/PBCH block or a PO or a PEI

2303

The UE receives the LP-WUS based on the QCL assumption using the LR

3400

3401

A UE receives a set of configurations for LP-SYNC and/or LP-WUS in higher layer parameters using the MR

3402

The UE determines the LP-SYNC and/or LP-WUS is QCLed with a DL RS received using the MR

3403

The UE receives the LP-SYNC and/or LP-WUS based on the QCL assumption using the LR

TRANSMITTING AND RECEIVING LOW POWER SIGNALS

CROSS-REFERENCE TO RELATED AND CLAIM OF PRIORITY

The present application claims priority under 35 U.S.C. § 119(e) to: U.S. Provisional Patent Application No. 63/433,939 filed on Dec. 20, 2022, and U.S. Provisional Patent Application No. 63/434,359 filed on Dec. 21, 2022, which are hereby incorporated by reference in their entirety.

TECHNICAL FIELD

The present disclosure relates generally to wireless communication systems and, more specifically, the present disclosure is related to apparatuses and methods for transmitting and receiving low power signals.

BACKGROUND

Wireless communication has been one of the most successful innovations in modern history. Recently, the number of subscribers to wireless communication services exceeded five billion and continues to grow quickly. The demand of wireless data traffic is rapidly increasing due to the growing popularity among consumers and businesses of smart phones and other mobile data devices, such as tablets, "note pad" computers, net books, eBook readers, and machine type of devices. In order to meet the high growth in mobile data traffic and support new applications and deployments, improvements in radio interface efficiency and coverage are of paramount importance. To meet the demand for wireless data traffic having increased since deployment of 4G communication systems, and to enable various vertical applications, 5G communication systems have been developed and are currently being deployed.

SUMMARY

The present disclosure relates to transmitting and receiving low power signals.

In one embodiment, a user equipment (UE) in a wireless communication system is provided. The UE includes a transceiver configured to receive configurations for occasions to receive first and second types of low power signals and a processor operably coupled to the transceiver. The processor is configured to determine, based on the configurations, a first set of periodic occasions to receive the first type of low power signal and a second set of non-periodic occasions to receive the second type of low power signal. The transceiver is further configured to receive the first type of low power signal and the second type of low power signal. The processor is further configured to perform, based on the first type of low power signal, at least one of a synchronization measurement and a radio resource management (RRM) measurement.

In another embodiment, a base station (BS) in a wireless communication system is provided. The BS includes a processor configured to determine a first set of periodic occasions to transmit a first type of low power signal, a second set of non-periodic occasions to transmit a second type of low power signal, and configurations for the first and second sets of occasions. The first type of low power signal is for at least one of a synchronization measurement and a RRM measurement. The BS further includes a transceiver operably coupled to the processor. The transceiver is configured to transmit the configurations for the first and second sets of occasions, transmit the first type of low power signal based on the first set of periodic occasions, and transmit the second type of low power signal based on the second set of non-periodic occasions.

In yet another embodiment, a method of a UE in a wireless communication system is provided. The method includes receiving configurations for occasions to receive first and second types of low power signals and determining, based on the configurations, a first set of periodic occasions to receive the first type of low power signal and a second set of non-periodic occasions to receive the second type of low power signal. The method further includes receiving the first type of low power signal and the second type of low power signal and performing, based on the first type of low power signal, at least one of a synchronization measurement and a RRM measurement.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system, or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1-34, discussed below, and the various, non-limiting embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

To meet the demand for wireless data traffic having increased since deployment of 4G communication systems, and to enable various vertical applications, 5G/NR communication systems have been developed and are currently being deployed. The 5G/NR communication system is implemented in higher frequency (mmWave) bands, e.g., 28 GHz or 60 GHz bands, so as to accomplish higher data rates or in lower frequency bands, such as 6 GHz, to enable robust coverage and mobility support. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G/NR communication systems.

In addition, in 5G/NR communication systems, development for system network improvement is under way based on advanced small cells, cloud radio access networks (RANs), ultra-dense networks, device-to-device (D2D) communication, wireless backhaul, moving network, cooperative communication, coordinated multi-points (COMP), reception-end interference cancelation and the like.

The discussion of 5G systems and frequency bands associated therewith is for reference as certain embodiments of the present disclosure may be implemented in 5G systems. However, the present disclosure is not limited to 5G systems, or the frequency bands associated therewith, and embodiments of the present disclosure may be utilized in connection with any frequency band. For example, aspects of the present disclosure may also be applied to deployment of 5G communication systems, 6G, or even later releases which may use terahertz (THz) bands.

The following documents and standards descriptions are hereby incorporated by reference into the present disclosure as if fully set forth herein: [1] 3GPP TS 38.211 v17.1.0, "NR; Physical channels and modulation;" [2] 3GPP TS 38.212 v17.1.0, "NR; Multiplexing and channel coding;" [3] 3GPP TS 38.213 v17.1.0, "NR; Physical layer procedures for control;" [4] 3GPP TS 38.214 v17.1.0, "NR; Physical layer procedures for data;" and [5] 3GPP TS 38.331 v17.1.0, "NR; Radio Resource Control (RRC) protocol specification."

Figure 1:
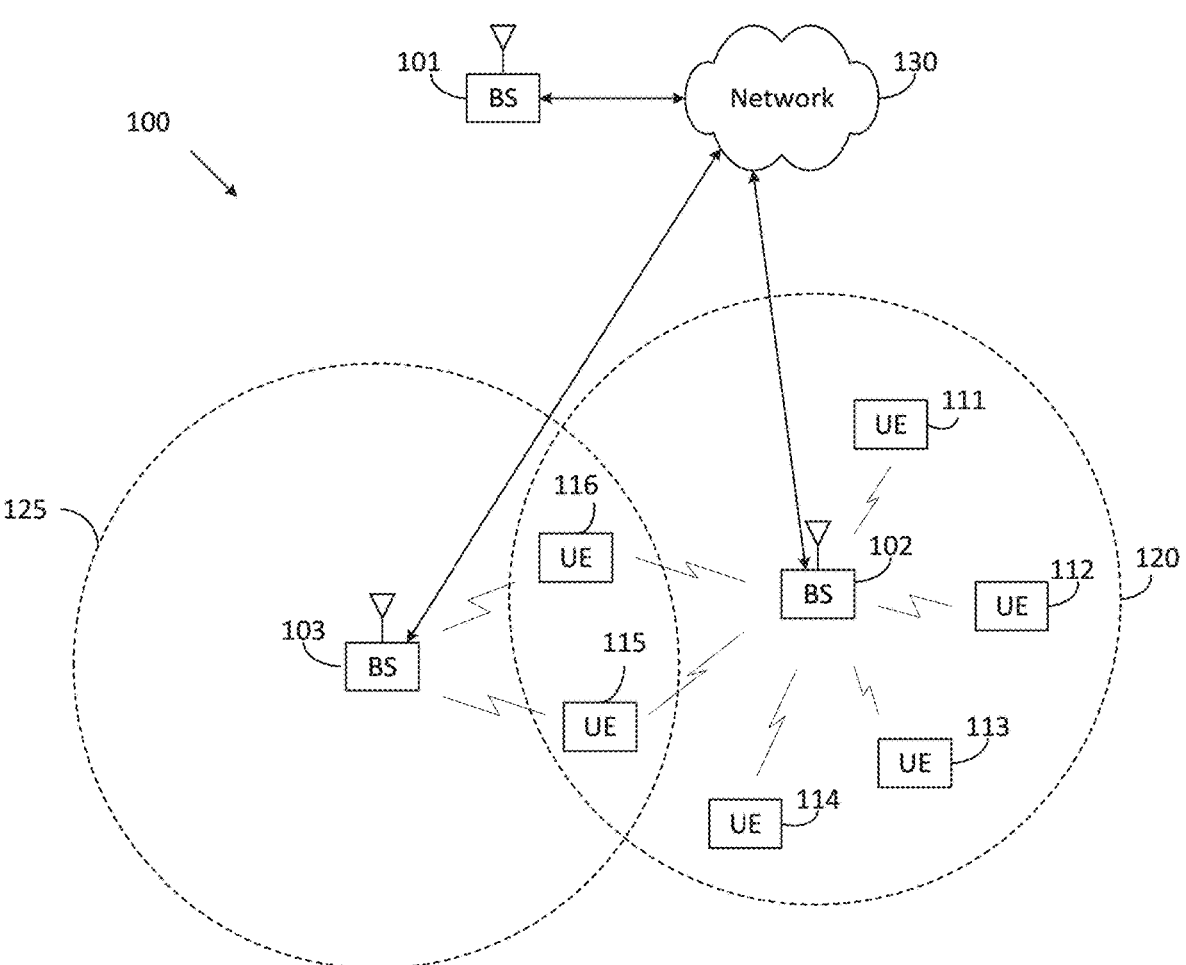
FIG. 1 illustrates an example wireless network according to embodiments of the present disclosure.
Figure 2:
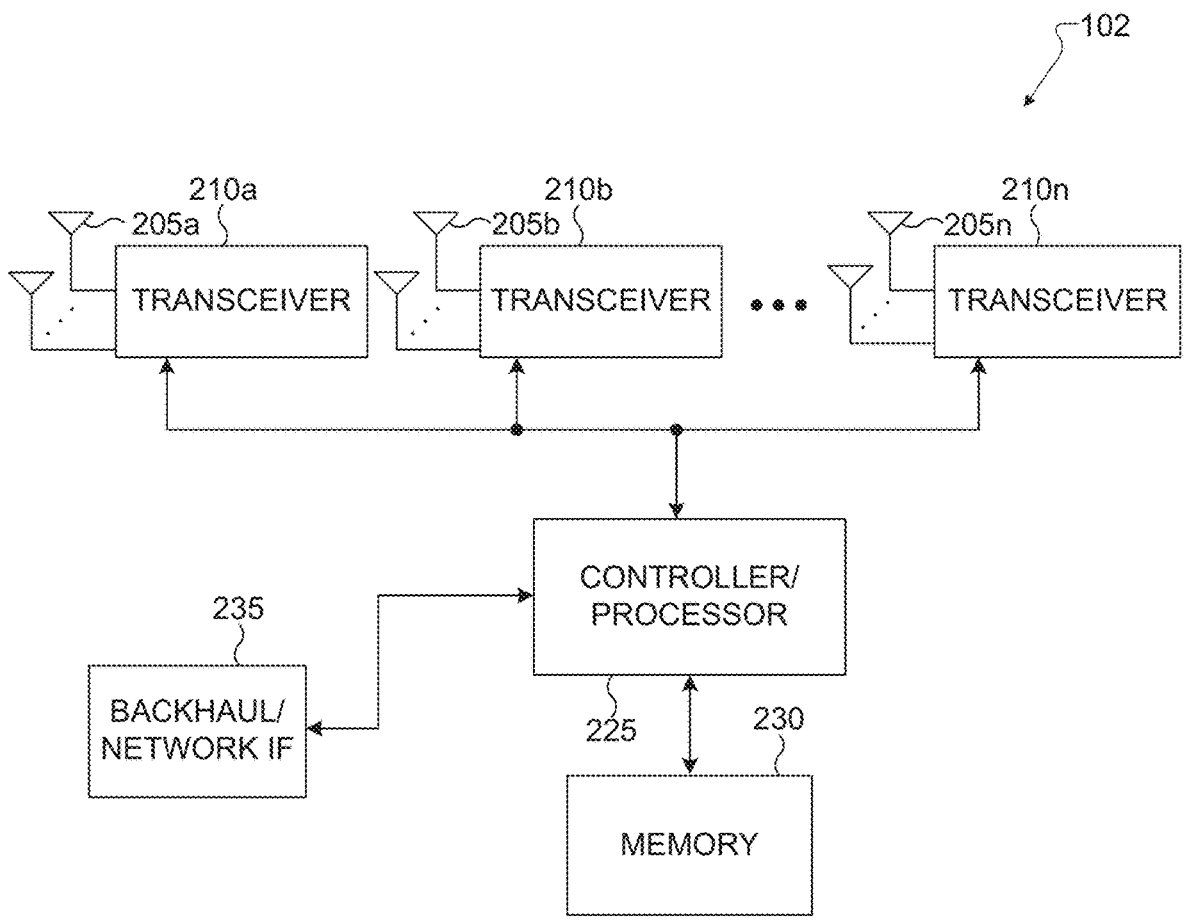
FIG. 2 illustrates an example gNodeB (gNB) according to embodiments of the present disclosure.
Figure 3:
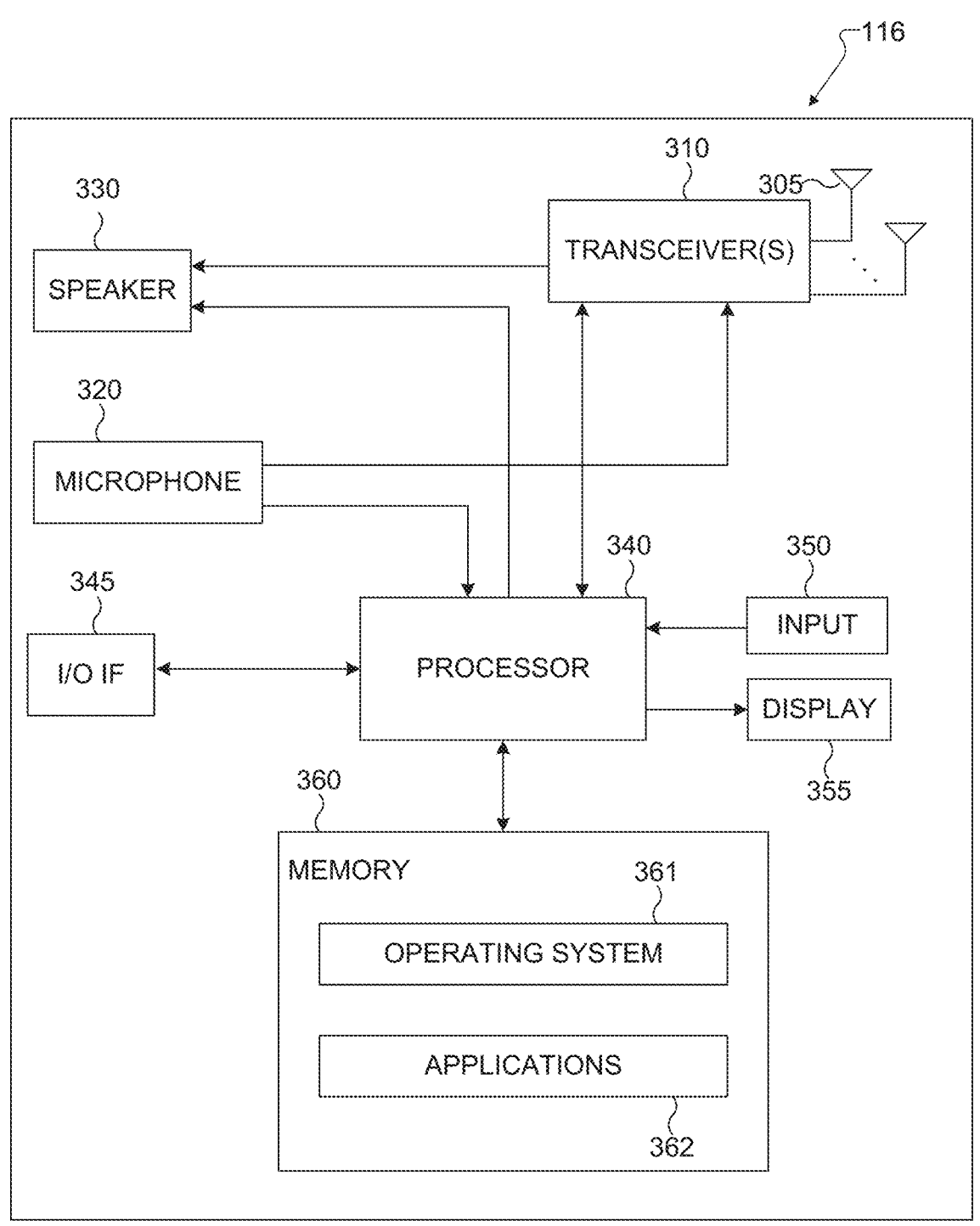
FIG. 3 illustrates an example UE according to embodiments of the present disclosure.

FIGS. 1-3 below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to how different embodiments may be implemented. Different embodiments of the present disclosure may be implemented in any suitably arranged communications system.

FIG. 1 illustrates an example wireless network 100 according to embodiments of the present disclosure. The embodiment of the wireless network 100 shown in FIG. 1 is for illustration only. Other embodiments of the wireless network 100 could be used without departing from the scope of this disclosure.

As shown in FIG. 1, the wireless network 100 includes a gNB 101 (e.g., base station, BS), a gNB 102, and a gNB 103. The gNB 101 communicates with the gNB 102 and the gNB 103. The gNB 101 also communicates with at least one network 130, such as the Internet, a proprietary Internet Protocol (IP) network, or other data network.

The gNB 102 provides wireless broadband access to the network 130 for a first plurality of user equipments (UEs) within a coverage area 120 of the gNB 102. The first plurality of UEs includes a UE 111, which may be located in a small business; a UE 112, which may be located in an enterprise; a UE 113, which may be a WiFi hotspot; a UE 114, which may be located in a first residence; a UE 115, which may be located in a second residence; and a UE 116, which may be a mobile device, such as a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115 and the UE 116. In some embodiments, one or more of the gNBs 101-103 may communicate with each other and with the UEs 111-116 using 5G/NR, long term evolution (LTE), long term evolution-advanced (LTE-A), WiMAX, WiFi, or other wireless communication techniques.

Depending on the network type, the term "base station" or "BS" can refer to any component (or collection of components) configured to provide wireless access to a network, such as transmit point (TP), transmit-receive point (TRP), an enhanced base station (eNodeB or eNB), a 5G/NR base station (gNB), a macrocell, a femtocell, a WiFi access point (AP), or other wirelessly enabled devices. Base stations may provide wireless access in accordance with one or more wireless communication protocols, e.g., 5G/NR 3rd generation partnership project (3GPP) NR, long term evolution (LTE), LTE advanced (LTE-A), high speed packet access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

The dotted lines show the approximate extents of the coverage areas 120 and 125, which are shown as approximately circular for the purposes of illustration and explanation only. It should be clearly understood that the coverage areas associated with gNBs, such as the coverage areas 120 and 125, may have other shapes, including irregular shapes, depending upon the configuration of the gNBs and variations in the radio environment associated with natural and man-made obstructions.

As described in more detail below, one or more of the UEs 111-116 include circuitry, programing, or a combination thereof for receiving low power signals. In certain embodiments, one or more of the BSs 101-103 include circuitry, programing, or a combination thereof for transmitting low power signals.

Although FIG. 1 illustrates one example of a wireless network, various changes may be made to FIG. 1. For example, the wireless network 100 could include any number of gNBs and any number of UEs in any suitable arrangement. Also, the gNB 101 could communicate directly with any number of UEs and provide those UEs with wireless broadband access to the network 130. Similarly, each gNB 102-103 could communicate directly with the network 130 and provide UEs with direct wireless broadband access to the network 130. Further, the gNBs 101, 102, and/or 103 could provide access to other or additional external networks, such as external telephone networks or other types of data networks.

FIG. 2 illustrates an example gNB 102 according to embodiments of the present disclosure. The embodiment of the gNB 102 illustrated in FIG. 2 is for illustration only, and the gNBs 101 and 103 of FIG. 1 could have the same or similar configuration. However, gNBs come in a wide variety of configurations, and FIG. 2 does not limit the scope of this disclosure to any particular implementation of a gNB.

As shown in FIG. 2, the gNB 102 includes multiple antennas 205a-205n, multiple transceivers 210a-210n, a controller/processor 225, a memory 230, and a backhaul or network interface 235.

The transceivers 210a-210n receive, from the antennas 205a-205n, incoming radio frequency (RF) signals, such as signals transmitted by UEs in the wireless network 100. The transceivers 210a-210n down-convert the incoming RF signals to generate IF or baseband signals. The IF or baseband signals are processed by receive (RX) processing circuitry in the transceivers 210a-210n and/or controller/processor 225, which generates processed baseband signals by filtering, decoding, and/or digitizing the baseband or IF signals. The controller/processor 225 may further process the baseband signals.

Transmit (TX) processing circuitry in the transceivers 210a-210n and/or controller/processor 225 receives analog or digital data (such as voice data, web data, e-mail, or interactive video game data) from the controller/processor 225. The TX processing circuitry encodes, multiplexes, and/or digitizes the outgoing baseband data to generate processed baseband or IF signals. The transceivers 210a-210n up-converts the baseband or IF signals to RF signals that are transmitted via the antennas 205a-205n.

The controller/processor 225 can include one or more processors or other processing devices that control the overall operation of the gNB 102. For example, the controller/processor 225 could control the reception of uplink (UL) channel signals and the transmission of downlink (DL) channel signals by the transceivers 210a-210n in accordance with well-known principles. The controller/processor 225 could support additional functions as well, such as more advanced wireless communication functions. For instance, the controller/processor 225 could support beam forming or directional routing operations in which outgoing/incoming signals from/to multiple antennas 205a-205n are weighted differently to effectively steer the outgoing signals in a desired direction. As another example, the controller/processor 225 could support methods for transmitting low power signals. Any of a wide variety of other functions could be supported in the gNB 102 by the controller/processor 225.

The controller/processor 225 is also capable of executing programs and other processes resident in the memory 230, such as processes to transmit low power signals. The controller/processor 225 can move data into or out of the memory 230 as required by an executing process.

The controller/processor 225 is also coupled to the backhaul or network interface 235. The backhaul or network interface 235 allows the gNB 102 to communicate with other devices or systems over a backhaul connection or over a network. The interface 235 could support communications over any suitable wired or wireless connection(s). For example, when the gNB 102 is implemented as part of a cellular communication system (such as one supporting 5G/NR, LTE, or LTE-A), the interface 235 could allow the gNB 102 to communicate with other gNBs over a wired or wireless backhaul connection. When the gNB 102 is implemented as an access point, the interface 235 could allow the gNB 102 to communicate over a wired or wireless local area network or over a wired or wireless connection to a larger network (such as the Internet). The interface 235 includes any suitable structure supporting communications over a wired or wireless connection, such as an Ethernet or transceiver.

The memory 230 is coupled to the controller/processor 225. Part of the memory 230 could include a RAM, and another part of the memory 230 could include a Flash memory or other ROM.

Although FIG. 2 illustrates one example of gNB 102, various changes may be made to FIG. 2. For example, the gNB 102 could include any number of each component shown in FIG. 2. Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes antenna(s) 305, a transceiver(s) 310, and a microphone 320. The UE 116 also includes a speaker 330, a processor 340, an input/output (I/O) interface (IF) 345, an input 350, a display 355, and a memory 360. The memory 360 includes an operating system (OS) 361 and one or more applications 362.

The transceiver(s) 310 receives from the antenna(s) 305, an incoming RF signal transmitted by a gNB of the wireless network 100. The transceiver(s) 310 down-converts the incoming RF signal to generate an intermediate frequency (IF) or baseband signal. The IF or baseband signal is processed by RX processing circuitry in the transceiver(s) 310 and/or processor 340, which generates a processed baseband signal by filtering, decoding, and/or digitizing the baseband or IF signal. The RX processing circuitry sends the processed baseband signal to the speaker 330 (such as for voice data) or is processed by the processor 340 (such as for web browsing data).

TX processing circuitry in the transceiver(s) 310 and/or processor 340 receives analog or digital voice data from the microphone 320 or other outgoing baseband data (such as web data, e-mail, or interactive video game data) from the processor 340. The TX processing circuitry encodes, multiplexes, and/or digitizes the outgoing baseband data to generate a processed baseband or IF signal. The transceiver(s) 310 up-converts the baseband or IF signal to an RF signal that is transmitted via the antenna(s) 305.

The processor 340 can include one or more processors or other processing devices and execute the OS 361 stored in the memory 360 in order to control the overall operation of the UE 116. For example, the processor 340 could control the reception of DL channel signals and the transmission of UL channel signals by the transceiver(s) 310 in accordance with well-known principles. In some embodiments, the processor 340 includes at least one microprocessor or microcontroller.

The processor 340 is also capable of executing other processes and programs resident in the memory 360. For example, the processor 340 may execute processes for receiving low power signals as described in embodiments of the present disclosure. The processor 340 can move data into or out of the memory 360 as required by an executing process. In some embodiments, the processor 340 is configured to execute the applications 362 based on the OS 361 or in response to signals received from gNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the input 350, which includes, for example, a touchscreen, keypad, etc., and the display 355. The operator of the UE 116 can use the input 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random-access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUS). In another example, the transceiver(s) 310 may include any number of transceivers and signal processing chains and may be connected to any number of antennas. Also, while FIG. 3 illustrates the UE 116 configured as a mobile telephone or smartphone, UEs could be configured to operate as other types of mobile or stationary devices.

Figure 4A:
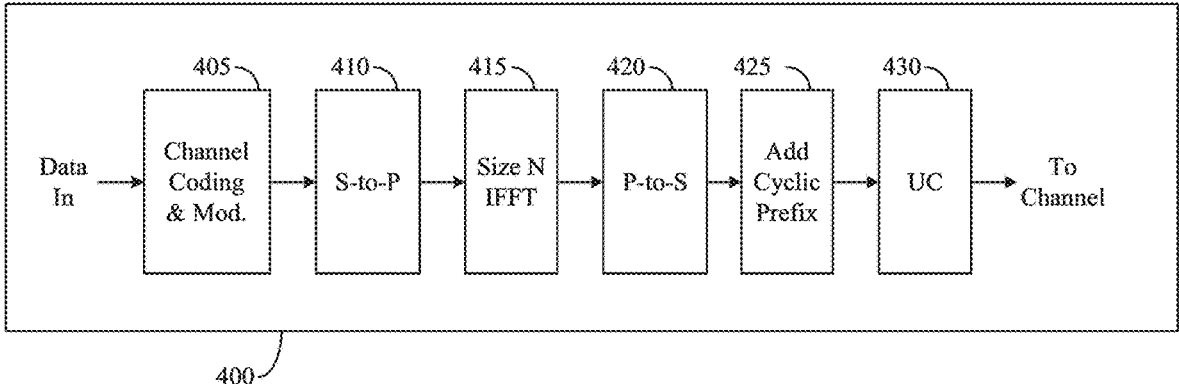
FIGS. 4A and 4B illustrate an example of a wireless transmit and receive paths according to embodiments of the present disclosure.
Figure 4B:
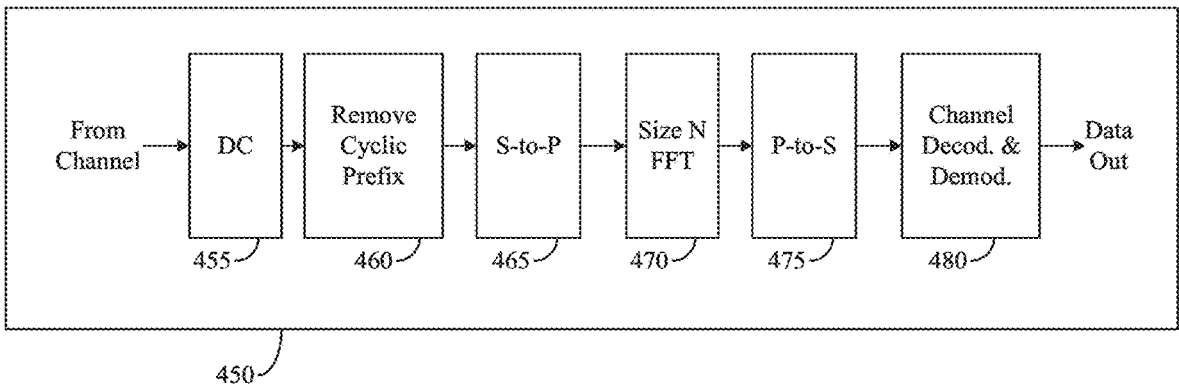

FIG. 4A and FIG. 4B illustrate an example of wireless transmit and receive paths 400 and 450, respectively, according to embodiments of the present disclosure. For example, a transmit path 400 may be described as being implemented in a gNB (such as gNB 102), while a receive path 450 may be described as being implemented in a UE (such as UE 116). However, it will be understood that the receive path 450 can be implemented in a gNB and that the transmit path 400 can be implemented in a UE. In some embodiments, the receive path 450 is configured for receiving low power signals as described in embodiments of the present disclosure.

As illustrated in FIG. 4A, the transmit path 400 includes a channel coding and modulation block 405, a serial-to-parallel (S-to-P) block 410, a size N Inverse Fast Fourier Transform (IFFT) block 415, a parallel-to-serial (P-to-S) block 420, an add cyclic prefix block 425, and an up-converter (UC) 430. The receive path 450 includes a down-converter (DC) 455, a remove cyclic prefix block 460, a S-to-P block 465, a size N Fast Fourier Transform (FFT) block 470, a parallel-to-serial (P-to-S) block 475, and a channel decoding and demodulation block 480.

In the transmit path 400, the channel coding and modulation block 405 receives a set of information bits, applies coding (such as a low-density parity check (LDPC) coding), and modulates the input bits (such as with Quadrature Phase Shift Keying (QPSK) or Quadrature Amplitude Modulation (QAM)) to generate a sequence of frequency-domain modulation symbols. The serial-to-parallel block 410 converts (such as de-multiplexes) the serial modulated symbols to parallel data in order to generate N parallel symbol streams, where N is the IFFT/FFT size used in the gNB 102 and the UE 116. The size N IFFT block 415 performs an IFFT operation on the N parallel symbol streams to generate time-domain output signals. The parallel-to-serial block 420 converts (such as multiplexes) the parallel time-domain output symbols from the size N IFFT block 415 in order to generate a serial time-domain signal. The add cyclic prefix block 425 inserts a cyclic prefix to the time-domain signal. The up-converter 430 modulates (such as up-converts) the output of the add cyclic prefix block 425 to a RF frequency for transmission via a wireless channel. The signal may also be filtered at a baseband before conversion to the RF frequency.

As illustrated in FIG. 4B, the down-converter 455 down-converts the received signal to a baseband frequency, and the remove cyclic prefix block 460 removes the cyclic prefix to generate a serial time-domain baseband signal. The serial-to-parallel block 465 converts the time-domain baseband signal to parallel time-domain signals. The size N FFT block 470 performs an FFT algorithm to generate N parallel frequency-domain signals. The (P-to-S) block 475 converts the parallel frequency-domain signals to a sequence of modulated data symbols. The channel decoding and demodulation block 480 demodulates and decodes the modulated symbols to recover the original input data stream.

Each of the gNBs 101-103 may implement a transmit path 400 that is analogous to transmitting in the downlink to UEs 111-116 and may implement a receive path 450 that is analogous to receiving in the uplink from UEs 111-116. Similarly, each of UEs 111-116 may implement a transmit path 400 for transmitting in the uplink to gNBs 101-103 and may implement a receive path 450 for receiving in the downlink from gNBs 101-103.

Each of the components in FIGS. 4A and 4B can be implemented using only hardware or using a combination of hardware and software/firmware. As a particular example, at least some of the components in FIGS. 4A and 4B may be implemented in software, while other components may be implemented by configurable hardware or a mixture of software and configurable hardware. For instance, the FFT block 470 and the IFFT block 415 may be implemented as configurable software algorithms, where the value of size N may be modified according to the implementation.

Furthermore, although described as using FFT and IFFT, this is by way of illustration only and should not be construed to limit the scope of the present disclosure. Other types of transforms, such as Discrete Fourier Transform (DFT) and Inverse Discrete Fourier Transform (IDFT) functions, can be used. It will be appreciated that the value of the variable N may be any integer number (such as 1, 2, 3, 4, or the like) for DFT and IDFT functions, while the value of the variable N may be any integer number that is a power of two (such as 1, 2, 4, 8, 16, or the like) for FFT and IFFT functions.

Although FIGS. 4A and 4B illustrate examples of wireless transmit and receive paths 400 and 450, respectively, various changes may be made to FIGS. 4A and 4B. For example, various components in FIGS. 4A and 4B can be combined, further subdivided, or omitted and additional components can be added according to particular needs. Also, FIGS. 4A and 4B are meant to illustrate examples of the types of transmit and receive paths that can be used in a wireless network. Any other suitable architectures can be used to support wireless communications in a wireless network.

Figure 5:
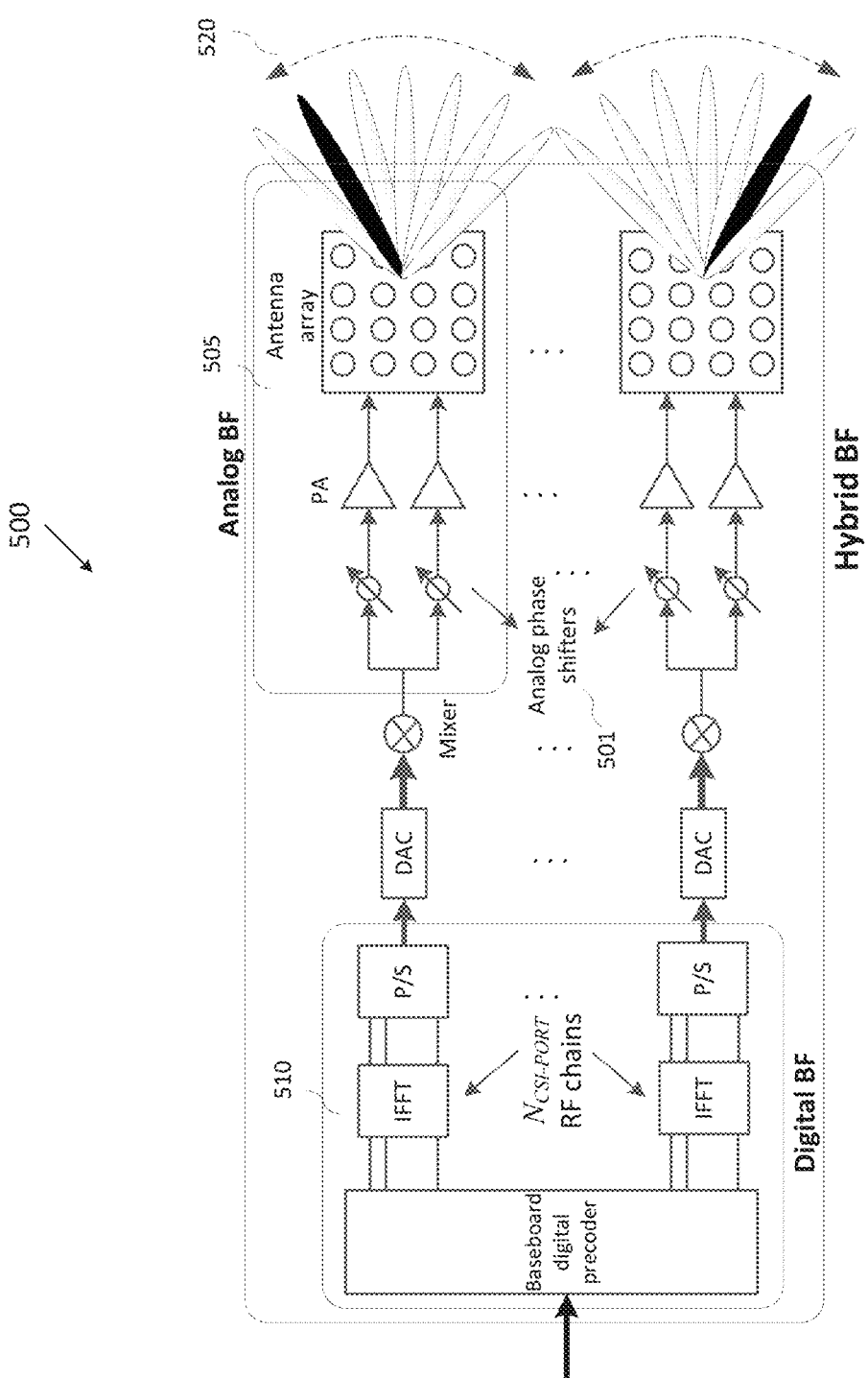
FIG. 5 illustrates an example of a transmitter structure for beamforming according to embodiments of the present disclosure.

FIG. 5 illustrates an example of a transmitter structure 500 for beamforming according to embodiments of the present disclosure. In certain embodiments, one or more of gNB 102 or UE 116 includes the transmitter structure 500. For example, one or more of antenna 205 and its associated systems or antenna 305 and its associated systems can be included in transmitter structure 500. This example is for illustration only and other embodiments can be used without departing from the scope of the present disclosure.

Accordingly, embodiments of the present disclosure recognize that Rel-14 LTE and Rel-15 NR support up to 32 channel state information reference signal (CSI-RS) antenna ports which enable an eNB or a gNB to be equipped with a large number of antenna elements (such as 64 or 128). A plurality of antenna elements can then be mapped onto one CSI-RS port. For mmWave bands, although a number of antenna elements can be larger for a given form factor, a number of CSI-RS ports, that can correspond to the number of digitally precoded ports, can be limited due to hardware constraints (such as the feasibility to install a large number of analog-to-digital converters (ADCs)/digital-to-analog converters (DACs) at mmWave frequencies) as illustrated in FIG. 5. Then, one CSI-RS port can be mapped onto a large number of antenna elements that can be controlled by a bank of analog phase shifters 501. One CSI-RS port can then correspond to one sub-array which produces a narrow analog beam through analog beamforming 505. This analog beam can be configured to sweep across a wider range of angles 520 by varying the phase shifter bank across symbols or slots/subframes. The number of sub-arrays (equal to the number of RF chains) is the same as the number of CSI-RS ports $N_{CSI-PORT}$. A digital beamforming unit 510 performs a linear combination across $N_{CSI-PORT}$ analog beams to further increase a precoding gain. While analog beams are wideband (hence not frequency-selective), digital precoding can be varied across frequency sub-bands or resource blocks. Receiver operation can be conceived analogously.

Since the transmitter structure 500 of FIG. 5 utilizes multiple analog beams for transmission and reception (wherein one or a small number of analog beams are selected out of a large number, for instance, after a training duration that is occasionally or periodically performed), the term "multi-beam operation" is used to refer to the overall system aspect. This includes, for the purpose of illustration, indicating the assigned DL or UL TX beam (also termed "beam indication"), measuring at least one reference signal for calculating and performing beam reporting (also termed "beam measurement" and "beam reporting", respectively), and receiving a DL or UL transmission via a selection of a corresponding RX beam. The system of FIG. 5 is also applicable to higher frequency bands such as >52.6 GHz (also termed frequency range 4 or FR4). In this case, the system can employ only analog beams. Due to the O2 absorption loss around 60 GHz frequency (~10 dB additional loss per 100 m distance), a larger number and narrower analog beams (hence a larger number of radiators in the array) are necessary to compensate for the additional path loss.

NR supported discontinuous reception (DRX) for a UE in either RRC_IDLE/RRC_INACTIVE mode or RRC_CONNECTED mode, such that the UE could stop receiving signals or channels during the inactive period within the DRX cycle and save power consumption. In Rel-16, enhancement towards DRX for RRC_CONNECTED mode (e.g., C-DRX) was introduced, wherein a new downlink control information (DCI) format was used to help the UE to skip a ON duration within a C-DRX cycle such that further power saving gain could be achieved. In Rel-17, enhancement towards DRX for RRC_IDLE/RRC_INACTIVE mode (e.g., I-DRX) was introduced, wherein a paging early indication (PEI) was used for a UE to skip monitoring paging occasions (POS) such that extra power saving gain could be achieved.

However, the UE still needs to frequently wake up to monitor the new DCI format or the PEI, such that the radio of the UE cannot be fully turned off for a long duration. Embodiments of the present disclosure recognize to avoid such situation and to acquire further power saving gain, an additional receiver radio is evaluated, wherein the additional receiver radio can be used for monitoring a particular set of signals with very low power consumption, and the main receiver radio can be turned off or operating with a very lower power for a long duration.

The present disclosure focuses on the transmission pattern of the low power signals that could be received by the additional receiver radio.

The present disclosure focuses on the design of transmission pattern of a set of low power signals for synchronization and/or waking up purposes, wherein the set of signals are received by an additional receiver. The transmission pattern is also assumed by a UE for reception, e.g., the transmission occasions determined by the UE can be used as reception occasions. More precisely, the following aspects are included in the present disclosure:

Transmission pattern for one signal for both synchronization and waking up purposes.

Transmission pattern for one signal with two parts for synchronization and waking up purposes.

Transmission pattern for two signals for synchronization and waking up purposes, respectively.

In one embodiment, a type of signals (e.g., with low reception power) can be supported, wherein the type of signals can be used to support both synchronization and wake-up indication functionalities. The type of signals can be denoted as low-power wake-up-signal (LP-WUS).

For one instance, an instant of the transmission of the type of signals carries at least information on whether a main receiver needs to wake up to receive signal/channel.

For another instance, an instant of the transmission of the type of signals carries at least information on an identification and/or timing.

For yet another instance, the reception of the type of signals can be performed by a secondary receiver different from a main receiver (e.g., denoted as MR), wherein the secondary receiver can operate with low power consumption (e.g., denoted as LR).

In one sub-embodiment, at least one of the following example transmission patterns can be supported. Multiple examples can be supported and subject to a configuration.

Figure 6:
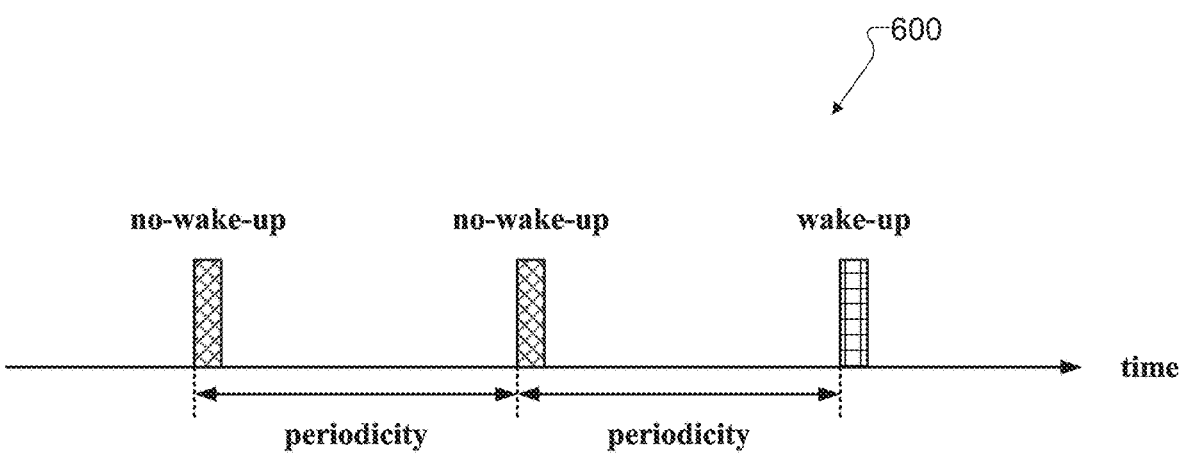
FIG. 6 illustrates a timeline of a transmission pattern of low-power wake-up signal (LP-WUS) according to embodiments of the present disclosure.

FIG. 6 illustrates a timeline 600 of a transmission pattern of low-power wake-up signal (LP-WUS) according to embodiments of the present disclosure. For example, timeline 600 of a transmission pattern of LP-WUS can be utilized by the UE 116. This example is for illustration only and other embodiments can be used without departing from the scope of the present disclosure.

In one example, the type of signals can be transmitted periodically. The periodicity (e.g., time difference between two neighboring instances of the transmissions) can be either fixed or configured.

Figure 7:
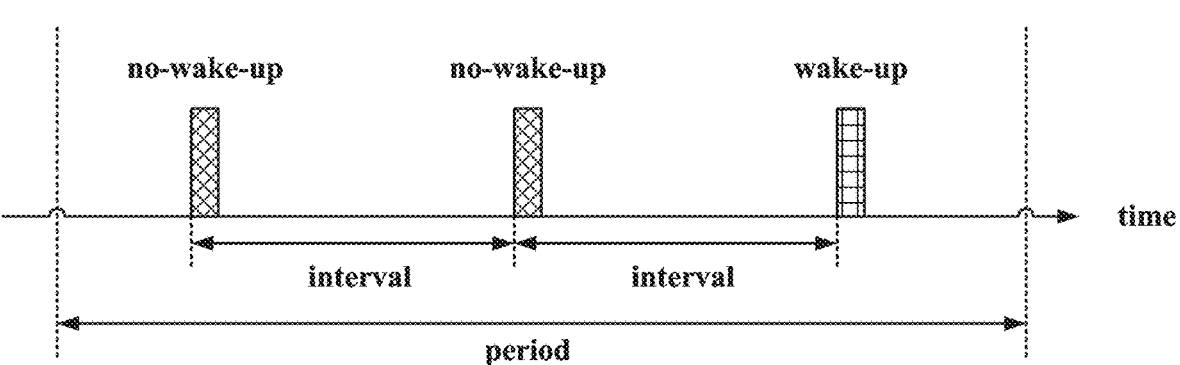
FIG. 7 illustrates a timeline of an example transmission pattern of LP-WUS according to embodiments of the present disclosure.

FIG. 7 illustrates a timeline 700 of an example transmission pattern of LP-WUS according to embodiments of the present disclosure. For example, timeline 700 of a transmission pattern of LP-WUS can be utilized by the UE 116. This example is for illustration only and other embodiments can be used without departing from the scope of the present disclosure.

In another example, the type of signals can be transmitted semi-statically. The transmission of the type of signals can be confined within a time period, and the intervals between two neighboring transmission instances are the same. The time period can be either fixed, configured, or determined based on a time-domain pattern. The interval can be either fixed or configured.

Figures 8, 9:
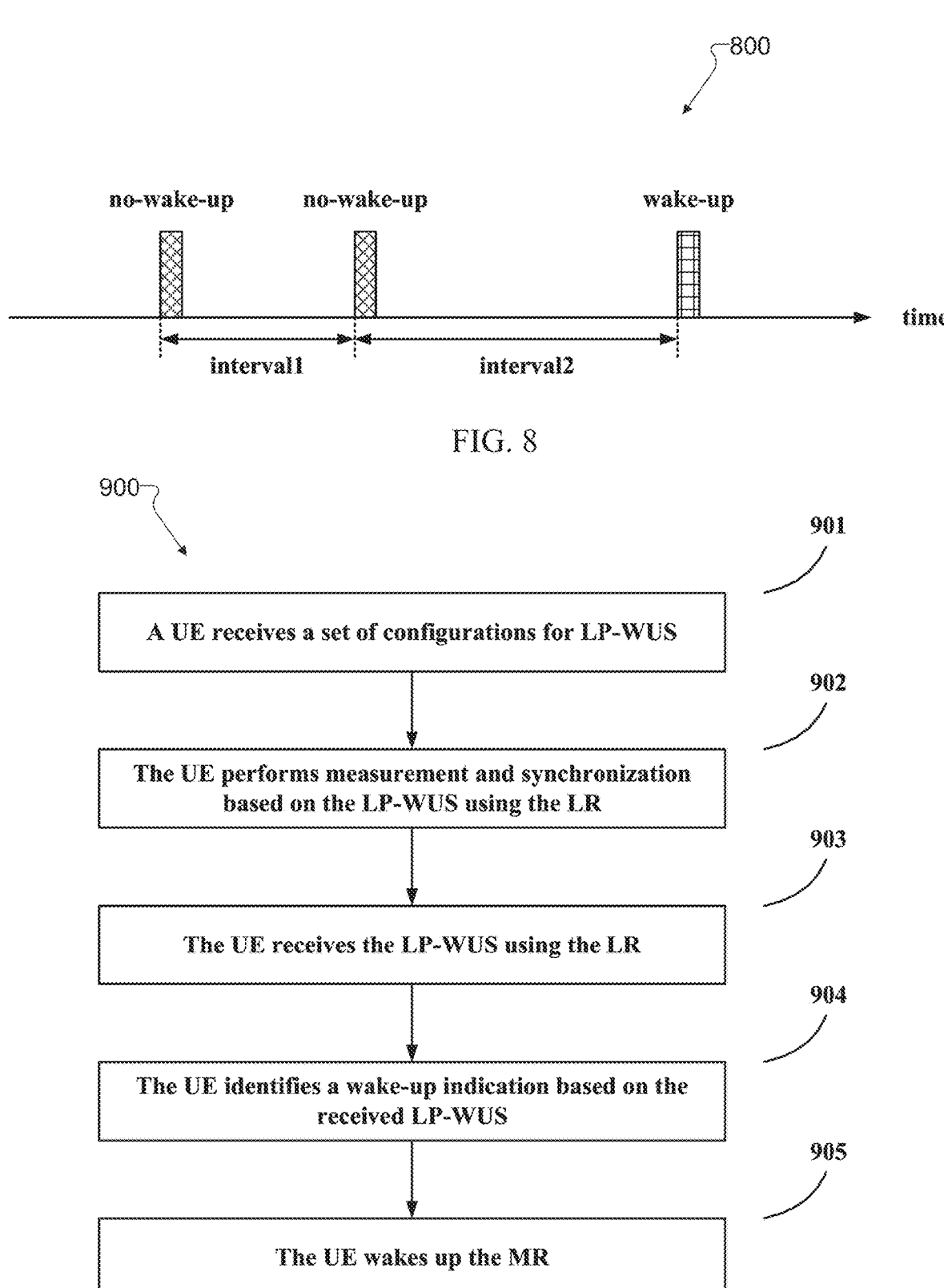
FIG. 8 illustrates a timeline of an example transmission pattern of LP-WUS according to embodiments of the present disclosure.
FIG. 9 illustrates a flowchart of an example UE procedure for using LP-WUS according to embodiments of the present disclosure.

FIG. 8 illustrates a timeline 800 of an example transmission pattern of LP-WUS according to embodiments of the present disclosure. For example, timeline 800 of a transmission pattern of LP-WUS can be utilized by the UE 116. This example is for illustration only and other embodiments can be used without departing from the scope of the present disclosure.

In yet another example, the type of signals can be transmitted aperiodically, e.g., in an on-demand manner. The transmission of the type of signals can be aperiodic and the intervals between two neighboring transmission instances may or may not be the same. The time domain locations for the transmission of the type of signals can be either configured or indicated to the UE 116. In one further view, the transmissions of the type of signals can be confined within a time domain period.

FIG. 9 illustrates a flowchart of an example UE procedure 900 for using LP-WUS according to embodiments of the present disclosure. For example, procedure 900 of an example UE procedure for using LP-WUS can be performed by the UE 116. This example is for illustration only and other embodiments can be used without departing from the scope of the present disclosure.

The procedure begins in 901, a UE receives a set of configurations for LP-WUS. In 902, the UE 116 then performs measurement and synchronization based on the LP-WUS using the LR. In 903, the UE 116 then receives the LP-WUS using the LR. In 904, the UE 116 then identified a wake-up indication based on the received LP-WUS. In 905, the UE 116 then wakes up the MR.

In one sub-embodiment, with reference to FIG. 9, an example UE procedure on using the set of signals is shown.

In one embodiment, a type of signals (e.g., with low reception power) can be supported, wherein a first part of the type of signals can be used to support synchronization functionality and a second part of the type of signals can be used to support wake-up indication functionality. The first part of the type of signals can be denoted as LP-WUS-1 and the second part of the type of signals can be denoted as LP-WUS-2.

For one instance, an instant of the transmission of LP-WUS-2 carries at least information on whether a main receiver needs to wake up to receive signal/channel.

For another instance, an instant of the transmission of LP-WUS-1 carries at least information on an identification and/or timing.

For yet another instance, the reception of the type of signals can be performed by a secondary receiver different from a main receiver (e.g., denoted as MR), wherein the secondary receiver can operate with low power consumption (e.g., denoted as LR).

For yet another instance, the multiplexing of the two parts of the type of signals can be fixed. For one sub-instance, the OFDM symbol(s) for LP-WUS-1 and the OFDM symbol(s) for LP-WUS-2 corresponding to the same transmission instance are consecutive.

For yet another instance, if the LP-WUS-2 does not need to wake up the MR to receive signal/channel, the transmission of LP-WUS-2 can be absent.

In one sub-embodiment, at least one of the following example transmission patterns can be supported. Multiple examples can be supported and subject to a configuration.

Figure 10:
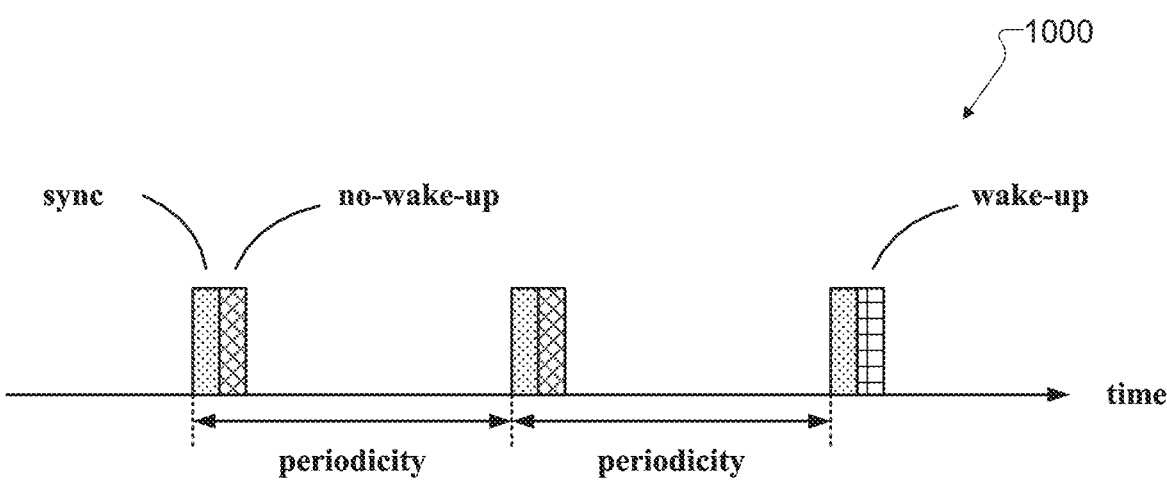
FIG. 10 illustrates a timeline of an example transmission pattern of LP-WUS according to embodiments of the present disclosure.

FIG. 10 illustrates a timeline 1000 of an example transmission pattern of LP-WUS according to embodiments of the present disclosure. For example, timeline 1000 of a transmission pattern of LP-WUS can be utilized by the UE 116. This example is for illustration only and other embodiments can be used without departing from the scope of the present disclosure.

In one example, the type of signals (e.g., including LP-WUS-1 and LP-WUS-2) can be transmitted periodically. The periodicity (e.g., time difference between two neighboring instances of the transmissions) can be either fixed or configured.

Figure 11:
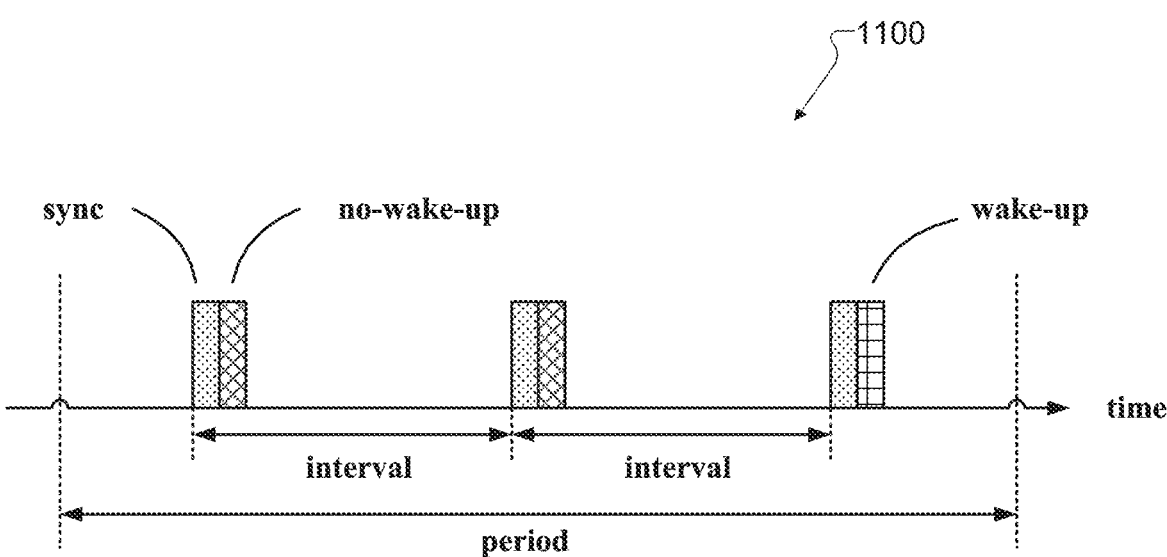
FIG. 11 illustrates a timeline of an example transmission pattern of LP-WUS to embodiments of the present disclosure.

FIG. 11 illustrates a timeline of an example transmission pattern of LP-WUS according to embodiments of the present disclosure. For example, timeline 1100 of a transmission pattern of LP-WUS can be utilized by the UE 116. This example is for illustration only and other embodiments can be used without departing from the scope of the present disclosure.

In another example, the type of signals (e.g., including LP-WUS-1 and LP-WUS-2) can be transmitted semi-statically. The transmission of the type of signals can be confined within a time period and the intervals between two neighboring transmission instances are the same. The time period can be either fixed, configured, or determined based on a time-domain pattern. The interval can be either fixed or configured.

Figure 12:
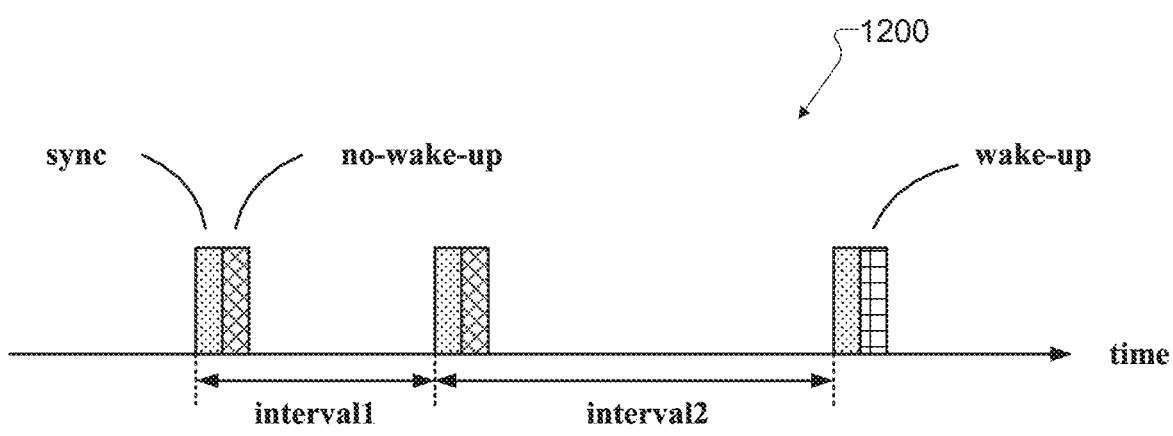
FIG. 12 illustrates a timeline of an example transmission pattern of LP-WUS
according to embodiments of the present disclosure.

FIG. 12 illustrates a timeline 1200 of an example transmission pattern of LP-WUS according to embodiments of the present disclosure. For example, timeline 1200 of a transmission pattern of LP-WUS can be utilized by the UE 116. This example is for illustration only and other embodiments can be used without departing from the scope of the present disclosure.

In yet another example, the type of signals (e.g., including LP-WUS-1 and LP-WUS-2) can be transmitted aperiodically, e.g., in an on-demand manner. The transmission of the type of signals can be aperiodic and the intervals between two neighboring transmission instances may or may not be the same. The time domain locations for the transmission of the type of signals can be either configured or indicated to the UE 116. In one further view, the transmissions of the type of signals can be confined within a time domain period.

Figure 13:
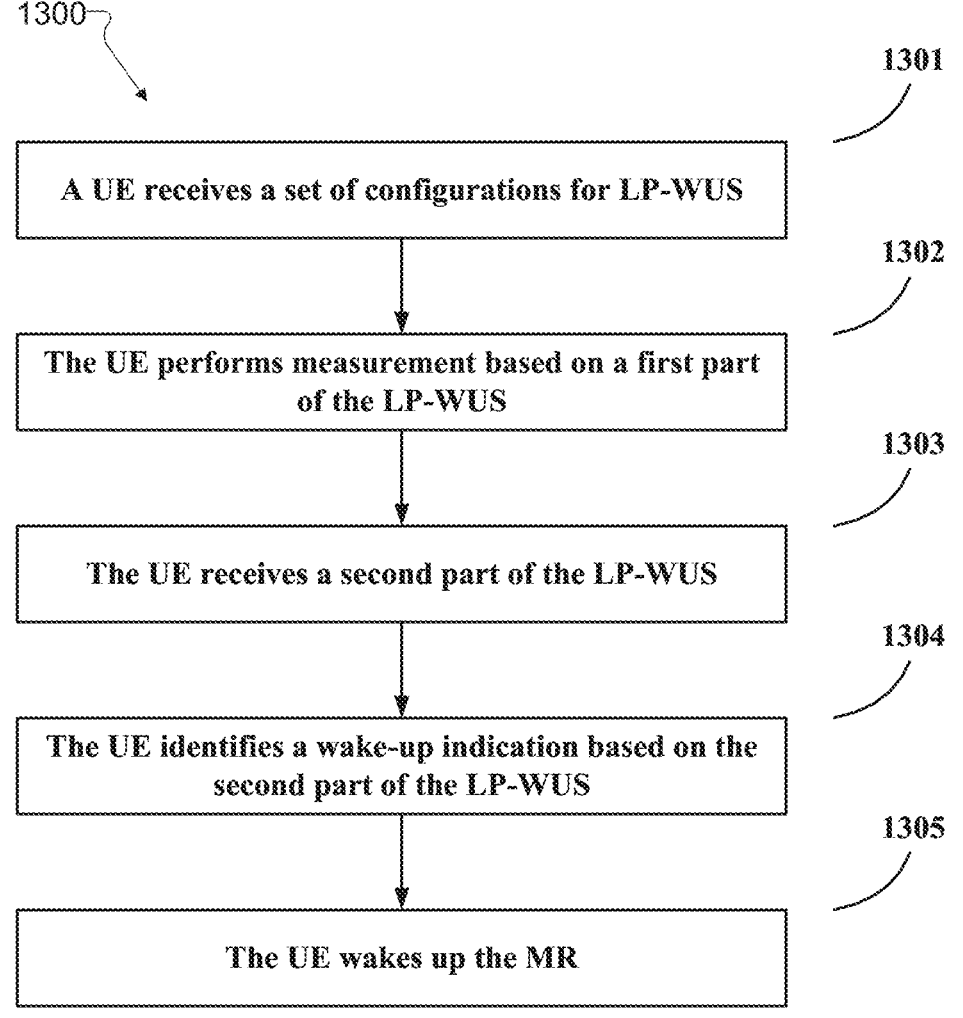
FIG. 13 illustrates a flowchart of an example UE procedure for using LP-WUS according to embodiments of the present disclosure.

FIG. 13 illustrates a flowchart of an example UE procedure 1300 for using LP-WUS according to embodiments of the present disclosure. For example, procedure 1300 of an example UE procedure for using LP-WUS can be performed by the UE 116. This example is for illustration only and other embodiments can be used without departing from the scope of the present disclosure.

The procedure begins in 1301, a UE receives a set of configurations for LP-WUS. In 1302, the UE 116 then performs measurement based on a first part of the LP-WUS. In 1303, the UE 116 then receives a second part of the LP-WUS. In 1304, the UE 116 then identifies a wake-up indication based on the second part of the LP-WUS. In 1305, the UE 116 wakes up the MR.

In one sub-embodiment, with reference to FIG. 13, an example UE procedure on using the set of signals is shown.

In one embodiment, two types of signals (e.g., both with low reception power by using a waveform that enables low power receiver) can be supported, wherein a first type of signals can be used to support the synchronization functionality (e.g., for at least one of a time domain and/or a frequency domain synchronization) and a second type of signals can be used to support the wake-up indication functionality (e.g., indicating a main receiver with higher reception power to wake up). The first type of signal can be denoted as LP-SYNC and/or the second type of signal can be denoted as LP-WUS.

For one instance, an instant of the transmission of LP-WUS carries at least information on whether a main receiver needs to wake up to receive signal/channel (e.g., the signal/channel can be a physical downlink control channel (PDCCH) for paging or a PDCCH including paging early indication for RRC_IDLE and/or RRC_INACTIVE mode or can be a PDCCH in a search space set for RRC_CONNECTED mode).

For another instance, an instant of the transmission of LP-SYNC carries at least information on an identification (e.g., a cell ID, and/or a UE ID, and/or a UE-group IC) and/or timing information (e.g., frame timing, and/or half frame timing, and/or slot timing, and/or symbol timing, and/or synchronization signal (SS)/physical broadcast channel (PBCH) block index, and/or candidate SS/PBCH block index).

For yet another instance, the reception of the two types of signals can be performed by a secondary receiver different from a main receiver (e.g., denoted as MR), wherein the secondary receiver can operate with low power consumption (e.g., denoted as LR).

For yet another instance, if the LP-WUS does not need to wake up the MR to receive signal/channel, the transmission of LP-WUS can be absent.

In one sub-embodiment, at least one of the following example transmission patterns can be supported. Multiple examples can be supported and subject to a configuration.

Figures 14, 15:
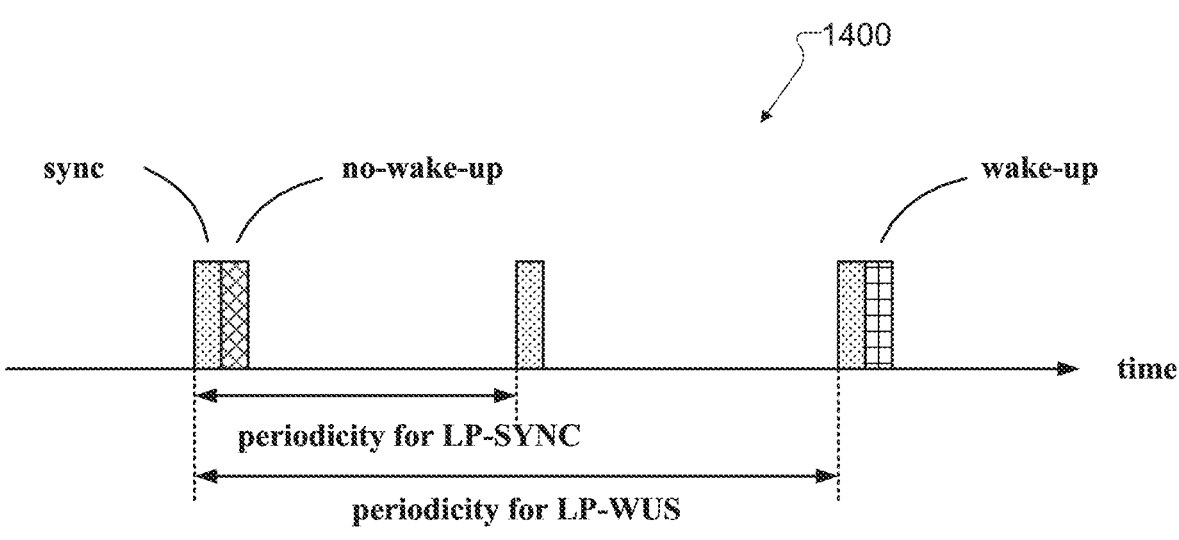
FIG. 14 illustrates timeline of an example transmission pattern of LP-WUS according to embodiments of the present disclosure.
FIG. 15 illustrates a timeline of an example transmission pattern of LP-WUS according to embodiments of the present disclosure.

FIG. 14 illustrates timeline 1400 of an example transmission pattern of LP-WUS according to embodiments of the present disclosure. For example, timeline 1400 of a transmission pattern of LP-WUS can be utilized by the UE 116. This example is for illustration only and other embodiments can be used without departing from the scope of the present disclosure.

In one example, the two type of signals (e.g., including LP-SYNC and LP-WUS) can be both transmitted periodically. The periodicity (e.g., time difference between two neighboring instances of the transmissions) for LP-SYNC can be either fixed or configured. The periodicity (e.g., time difference between two neighboring instances of the transmissions) for LP-WUS can be either fixed or configured. For one instance, the periodicity for LP-SYNC can be the same as the periodicity for LP-WUS. For another instance, the periodicity for LP-SYNC can be different from the periodicity for LP-WUS. For yet another instance, the periodicity for LP-SYNC can be no less than the periodicity for LP-WUS, and the periodicity for LP-SYNC can be an integer multiple of the periodicity for LP-WUS, such that the transmission occasion for LP-WUS can be associated with a transmission occasion for LP-SYNC (e.g., the OFDM symbol(s) for LP-SYNC and the OFDM symbol(s) for LP-WUS can be consecutive).

FIG. 15 illustrates a timeline 1500 of an example transmission pattern of LP-WUS according to embodiments of the present disclosure. For example, timeline 1500 of a transmission pattern of LP-WUS can be utilized by the UE 116. This example is for illustration only and other embodiments can be used without departing from the scope of the present disclosure.

In another example, the two type of signals (e.g., including LP-SYNC and LP-WUS) can be both transmitted semi-statically. The transmission of the two types of signals can be confined within a time period, and for each type of the signals, the intervals between two neighboring transmission instances are the same. For one instance, the time period can be either fixed, configured, or determined based on a time-domain pattern. For another instance, the interval for LP-SYNC can be either fixed or configured. For yet another instance, the interval for LP-WUS can be either fixed or configured. For yet another instance, the interval for LP-SYNC can be no less than the interval for LP-WUS and the interval for LP-SYNC can be an integer multiple of the interval for LP-WUS, such that the transmission occasion for LP-WUS can be associated with a transmission occasion for LP-SYNC (e.g., the OFDM symbol(s) for LP-SYNC and the OFDM symbol(s) for LP-WUS can be consecutive).

Figure 16:
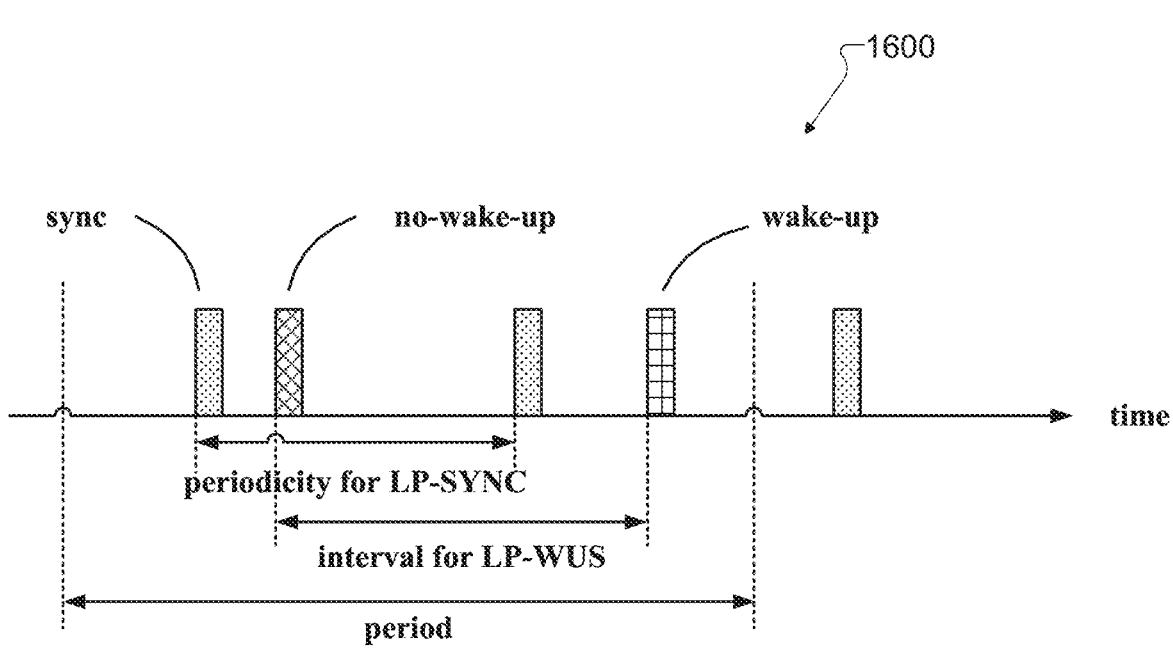
FIG. 16 illustrates a timeline of an example transmission pattern of LP-WUS Example transmission pattern of LP-WUS according to embodiments of the present disclosure.

FIG. 16 illustrates a timeline 1600 of an example transmission pattern of LP-WUS Example transmission pattern of LP-WUS according to embodiments of the present disclosure. For example, timeline 1600 of a transmission pattern of LP-WUS can be utilized by the UE 116. This example is for illustration only and other embodiments can be used without departing from the scope of the present disclosure.

In yet another example, one of the two type of signals (e.g., LP-SYNC) can be transmitted periodically, and the other of the two type of signals (e.g., LP-WUS) can be transmitted semi-statically. For one instance, the periodicity (e.g., time difference between two neighboring instances of the transmissions) for LP-SYNC can be either fixed or configured. For another instance, the transmission of LP-WUS can be confined within a time period, and the intervals between two neighboring transmission instances are the same. For yet another instance, the time period for LP-WUS can be either fixed, configured, or determined based on a time-domain pattern. For yet another instance, the periodicity for LP-SYNC can be different from the interval for LP-WUS. For yet another instance, the periodicity for LP-SYNC can be no less than the interval for LP-WUS, and the periodicity for LP-SYNC can be an integer multiple of the interval for LP-WUS. For one further evaluation, the transmission occasion for LP-WUS can be associated with a transmission occasion for LP-SYNC (e.g., the OFDM symbol(s) for LP-SYNC and the OFDM symbol(s) for LP-WUS can be consecutive). For another further evaluation, one transmission occasion for LP-SYNC can be associated with one or multiple transmission occasions for the LP-WUS.

Figure 17:
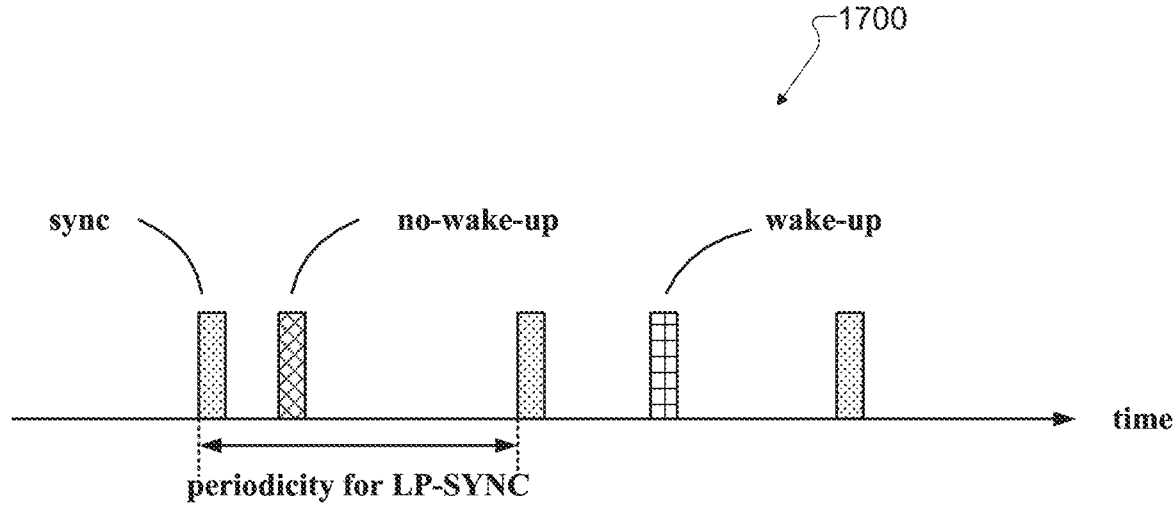
FIG. 17 illustrates a timeline of an example transmission pattern of LP-WUS according to embodiments of the present disclosure.

FIG. 17 illustrates a timeline 1700 of an example transmission pattern of LP-WUS according to embodiments of the present disclosure. For example, timeline 1700 of a transmission pattern of LP-WUS can be utilized by the UE 116. This example is for illustration only and other embodiments can be used without departing from the scope of the present disclosure.

In yet another example, one of the two type of signals (e.g., LP-SYNC) can be transmitted periodically and the other of the two type of signals (e.g., LP-WUS) can be transmitted aperiodically (e.g., in an on-demand manner). For one instance, the periodicity (e.g., time difference between two neighboring instances of the transmissions) for LP-SYNC can be either fixed or configured. For another instance, the time domain locations for the transmission of LP-WUS can be either configured or indicated to the UE 116. For yet another instance, the transmissions of LP-WUS can be confined within a time domain period. For yet another instance, the transmission occasion for LP-WUS can be associated with a transmission occasion for LP-SYNC (e.g., the OFDM symbol(s) for LP-SYNC and the OFDM symbol(s) for LP-WUS can be consecutive). For yet another instance, one transmission occasion for LP-SYNC can be associated with one or multiple transmission occasions for the LP-WUS.

Figure 18:
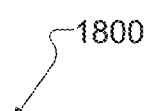
FIG. 18 illustrates a timeline of an example transmission pattern of LP-WUS according to embodiments of the present disclosure.
Figure 18:
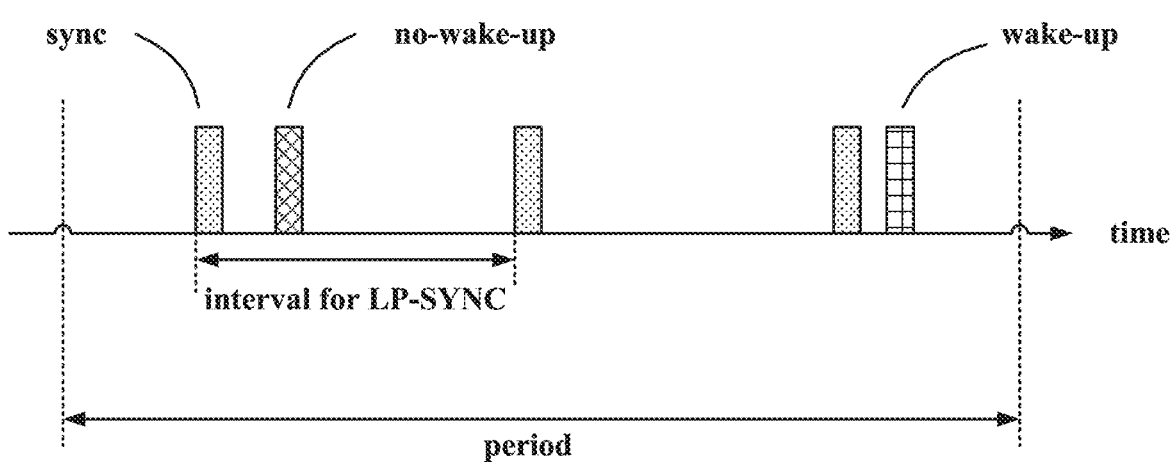

FIG. 18 illustrates a timeline of an example transmission pattern of LP-WUS according to embodiments of the present disclosure. For example, timeline 1800 of a transmission pattern of LP-WUS can be utilized by the UE 116. This example is for illustration only and other embodiments can be used without departing from the scope of the present disclosure.

In yet another example, one of the two type of signals (e.g., LP-SYNC) can be transmitted semi-statically and the other of the two type of signals (e.g., LP-WUS) can be transmitted aperiodically (e.g., in an on-demand manner). For one instance, the transmission of LP-SYNC can be confined within a time period and the intervals between two neighboring transmission instances are the same. For another instance, the time period can be either fixed, or configured, or determined based on a time-domain pattern. For yet another instance, the interval for LP-SYNC can be either fixed or configured. For yet another instance, the time domain locations for the transmission of LP-WUS can be either configured or indicated to the UE 116. For yet another instance, the transmissions of LP-WUS can be confined within a time domain period, e.g., same as the time domain period for LP-SYNC transmission. For yet another instance, the transmission occasion for LP-WUS can be associated with a transmission occasion for LP-SYNC (e.g., the OFDM symbol(s) for LP-SYNC and the OFDM symbol(s) for LP-WUS can be consecutive).

Figure 19:
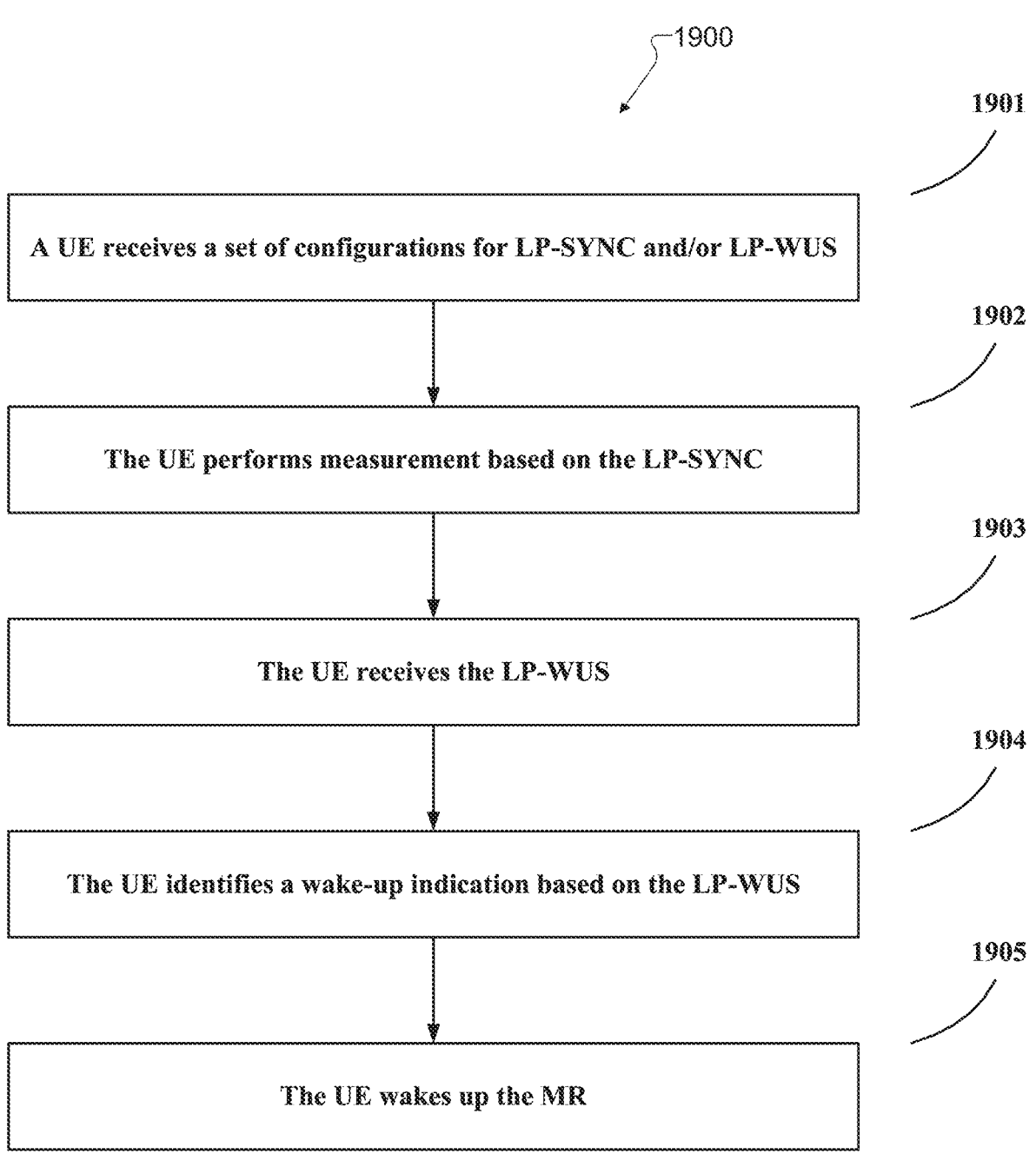
FIG. 19 illustrates a flowchart of an example UE procedure for using LP-WUS according to embodiments of the present disclosure.

FIG. 19 illustrates a flowchart of an example UE procedure 1900 for using LP-WUS according to embodiments of the present disclosure. For example, procedure 1900 for using LP-WUS can be performed by the UE 116. This example is for illustration only and other embodiments can be used without departing from the scope of the present disclosure.

The procedure begins in 1901, a UE receives a set of configurations for LP-SYNC and/or LP-WUS. In 1902, the UE 116 then performs measurement based on the LP-SYNC. In 1903, the UE 116 then receives the LP-WUS. In 1904, the UE 116 then identifies a wake up indication based on the LP-WUS. In 1905, the UE 116 then wakes up the MR.

In one sub-embodiment, with reference to FIG. 19, an example UE procedure on using the set of signals is shown.

In one embodiment, the parameter associated with the configuration for the low power signal (e.g., either LP-SYNC or LP-WUS) can be included in an UE assistance information, which is included in a RRC parameter transmitted from a UE to a gNB. A UE can report its preferred configuration parameter via the UE assistance information. UE assistance information can account for different environment conditions (e.g., urban vs. rural settings) or operational scenarios (e.g., stationary vs mobile state). Upon reception of the UE assistance information, the gNB may adjust the configuration parameter if needed. For one instance, the parameter can be at least one of a periodicity of the LP-SYNC, a periodicity of the LP-WUS, a time period that the LP-SYNC transmission is confined in, a time period that the LP-WUS transmission is confined in, or an interval between two neighboring transmission occasions for LP-WUS.

In another embodiment, the configuration for the low power signal (e.g., either LP-SYNC or LP-WUS) can be provided by system information (e.g., system information block 1, and/or system information block X where X>1). For one further evaluation, the configuration for the low power signal (e.g., either LP-SYNC or LP-WUS) can be also provided by a dedicated RRC parameter.

This disclosure also focuses on the QCL assumption determination of the low power signals that could be received by the additional receiver radio.

A quasi co-location (QCL) assumption in the disclosure may take one of the following example types and the associated set of parameters:

'typeA': {Doppler shift, Doppler spread, average delay, delay spread};
'typeB': {Doppler shift, Doppler spread};
'typeC': {Doppler shift, average delay};
'typeD': {Spatial Rx parameter}.

This disclosure focuses on the design of QCL assumption of a set of low power signals for synchronization and/or waking up purposes, wherein the set of signals are received by an additional receiver. More precisely, the following aspects are included in the disclosure:

QCL assumption for one signal for both synchronization and waking up purposes.
QCL assumption for one signal with two parts for synchronization and waking up purposes.
QCL assumption for two signals for synchronization and waking up purposes.

In one embodiment, a type of signals (e.g., with low reception power) can be supported, wherein the type of signals can be used to support both synchronization and wake-up indication functionalities. The type of signals can be denoted as low-power wake-up-signal (LP-WUS).

For one instance, an instant of the transmission of the type of signals carries at least information on whether a main receiver needs to wake up to receive signal/channel.

For another instance, an instant of the transmission of the type of signals carries at least information on an identification and/or timing.

For yet another instance, the reception of the type of signals can be performed by a secondary receiver different from a main receiver (e.g., denoted as MR), wherein the secondary receiver can operate with low power consumption (e.g., denoted as LR).

In one sub-embodiment, at least one of the following example on determining the QCL assumption and/or transmission configuration indicator (TCI) state can be supported.

Figures 20, 21:
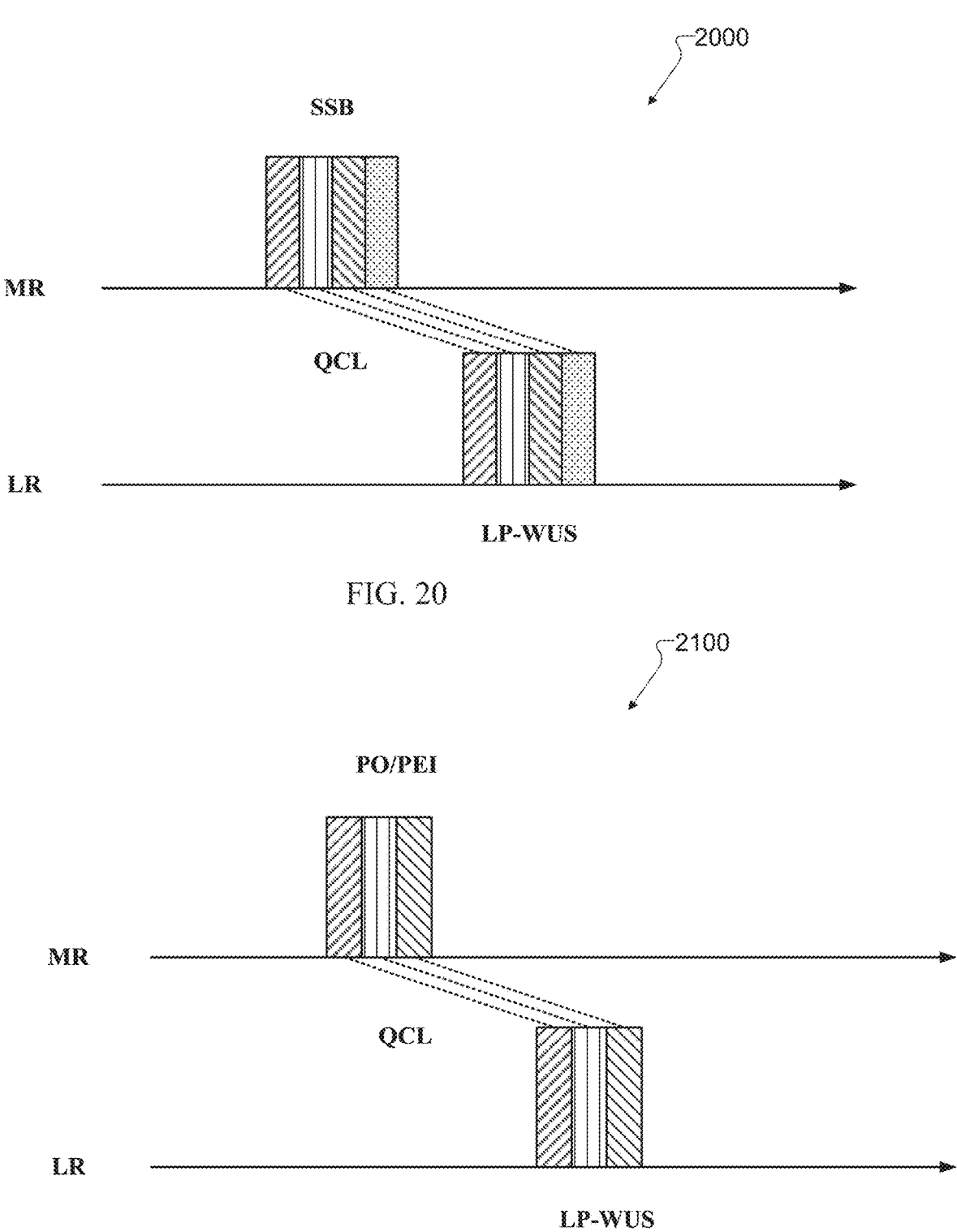
FIG. 20 illustrates a diagram of an example quasi co-location (QCL) assumption for LP-WUS according to embodiments of the present disclosure.
FIG. 21 illustrates a diagram of an example QCL assumption for LP-WUS according to embodiments of the present disclosure.

FIG. 20 illustrates a diagram 2000 of an example QCL assumption for LP-WUS according to embodiments of the present disclosure. For example, diagram 2000 of an example QCL assumption for LP-WUS can be utilized by any of the UEs 111-116 of FIG. 1. This example is for illustration only and other embodiments can be used without departing from the scope of the present disclosure.

In one example, the transmission of the set of signals can be according to a burst including one or multiple transmission instances within the burst. Each instance within the burst can be QCLed with a SS/PBCH block, wherein the SS/PBCH block can be received by the MR. In one instance of this example, the number of instances for LP-WUS in the burst can be same as the number of SS/PBCH blocks in a burst. In another instance of this example, the i-th instance for LP-WUS in the burst can be assumed to be QCLed with the i-th instance for SS/PBCH block in the burst. In yet another instance of this example, the example QCL assumption can be applicable at least for RRC_IDLE and/or RRC_INACTIVE mode.

FIG. 21 illustrates a diagram 2100 of an example QCL assumption for LP-WUS according to embodiments of the present disclosure. For example, diagram 2100 of an example QCL assumption for LP-WUS can be utilized by any of the UEs 111-116 of FIG. 1. This example is for illustration only and other embodiments can be used without departing from the scope of the present disclosure.

In another example, the transmission of the set of signals can be according to a burst including one or multiple transmission instances within the burst. Each instance within the burst can be QCLed with a RS of PDCCH associated with a PO and/or a PEI, wherein the PDCCH of paging/PEI can be received by the MR. In one instance of this example, the number of instances for LP-WUS in the burst can be same as the number of actually transmitted SS/PBCH blocks in a burst. In another instance of this example, the i-th instance of LP-WUS in the burst can be QCLed with the RS of PDCCH associated with the i-th instance of PO and/or PEI in the burst. In yet another instance of this example, the example QCL assumption can be applicable at least for RRC_IDLE and/or RRC_INACTIVE mode.

Figure 22:
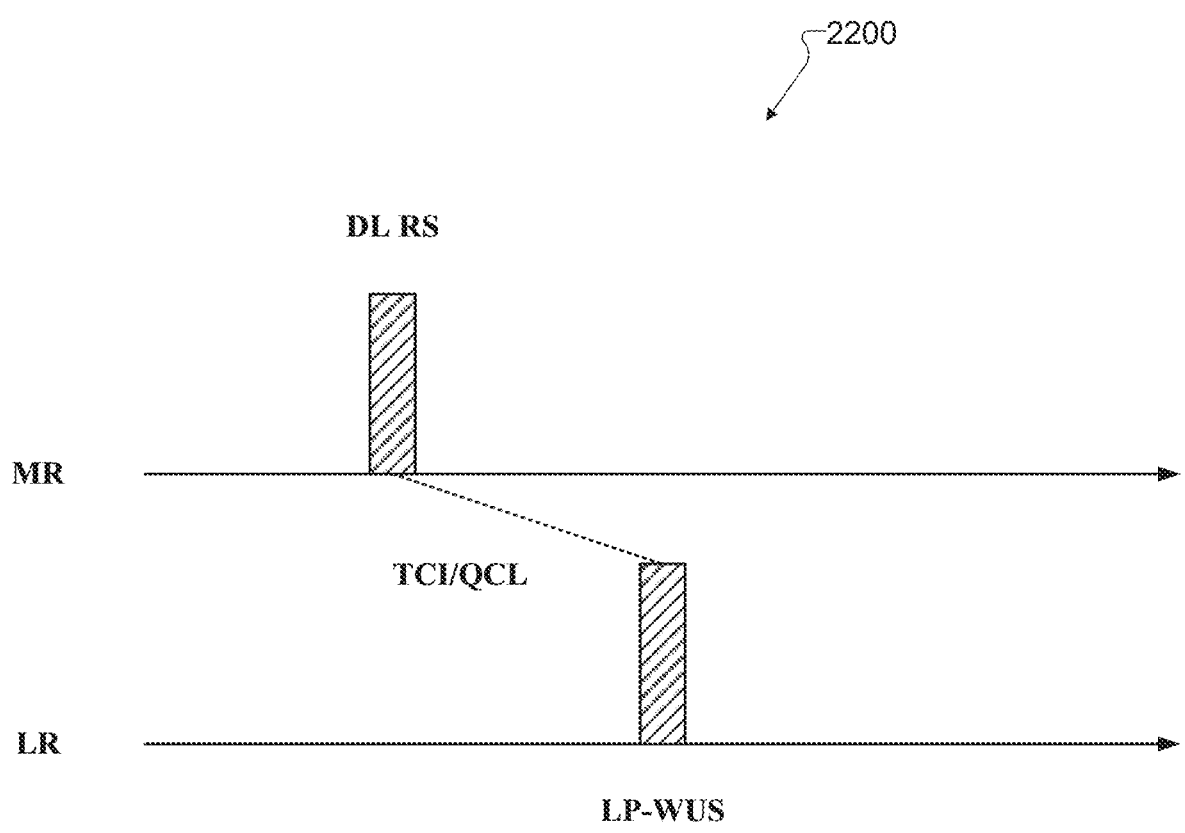
FIG. 22 illustrates a diagram of an example QCL assumption for LP-WUS according to embodiments of the present disclosure.

FIG. 22 illustrates a diagram 2200 of an example QCL assumption for LP-WUS according to embodiments of the present disclosure. For example, diagram 2200 of an example QCL assumption for LP-WUS can be utilized by any of the UEs 111-116 of FIG. 1. This example is for illustration only and other embodiments can be used without departing from the scope of the present disclosure.

In yet another example, the transmission of the set of signals can be QCLed with or sharing the same TCI state with a downlink RS, wherein the DL RS can be received by the MR. In one instance of this example, the example QCL assumption and/or TCI state can be applicable at least for RRC_CONNECTED mode. In another instance of this example, the QCL assumption and/or TCI state can be provided to the UE 116 by a higher layer parameter.

Figure 23:
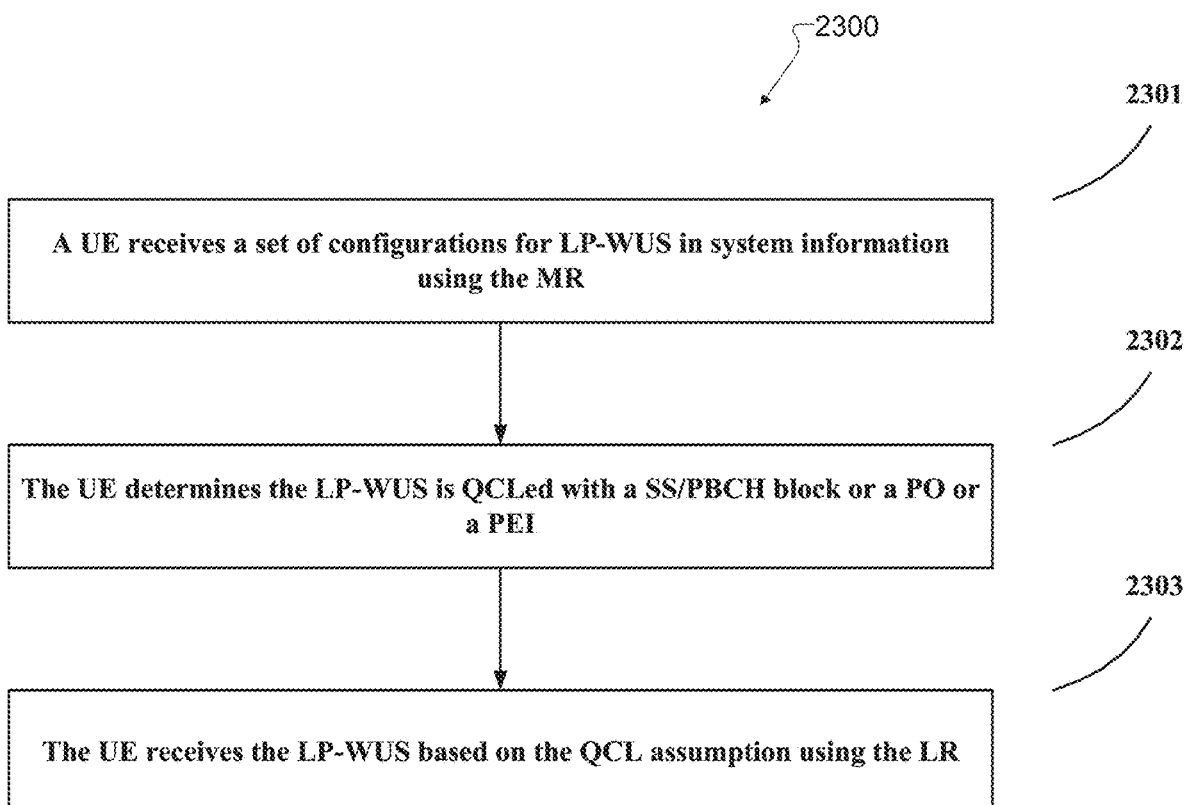
FIG. 23 illustrates a flowchart of an example UE procedure for receiving LP-WUS according to embodiments of the present disclosure.

FIG. 23 illustrates a flowchart of an example UE procedure 2300 for receiving LP-WUS according to embodiments of the present disclosure. For example, procedure 2300 for receiving LP-WUS can be performed by any of the UEs 111-116 of FIG. 1. This example is for illustration only and other embodiments can be used without departing from the scope of the present disclosure.

The procedure begins in 2301, a UE receives a set of configurations for LP_WUS in system information using the MR. In 2302, the UE 116 determines the LP-WUS is QCLed with a SS/PBCH block, a PO, or a PEI. In 2303, the UE 116 receives the LP-WUS based on the QCL assumption using the LR.

Figure 24:
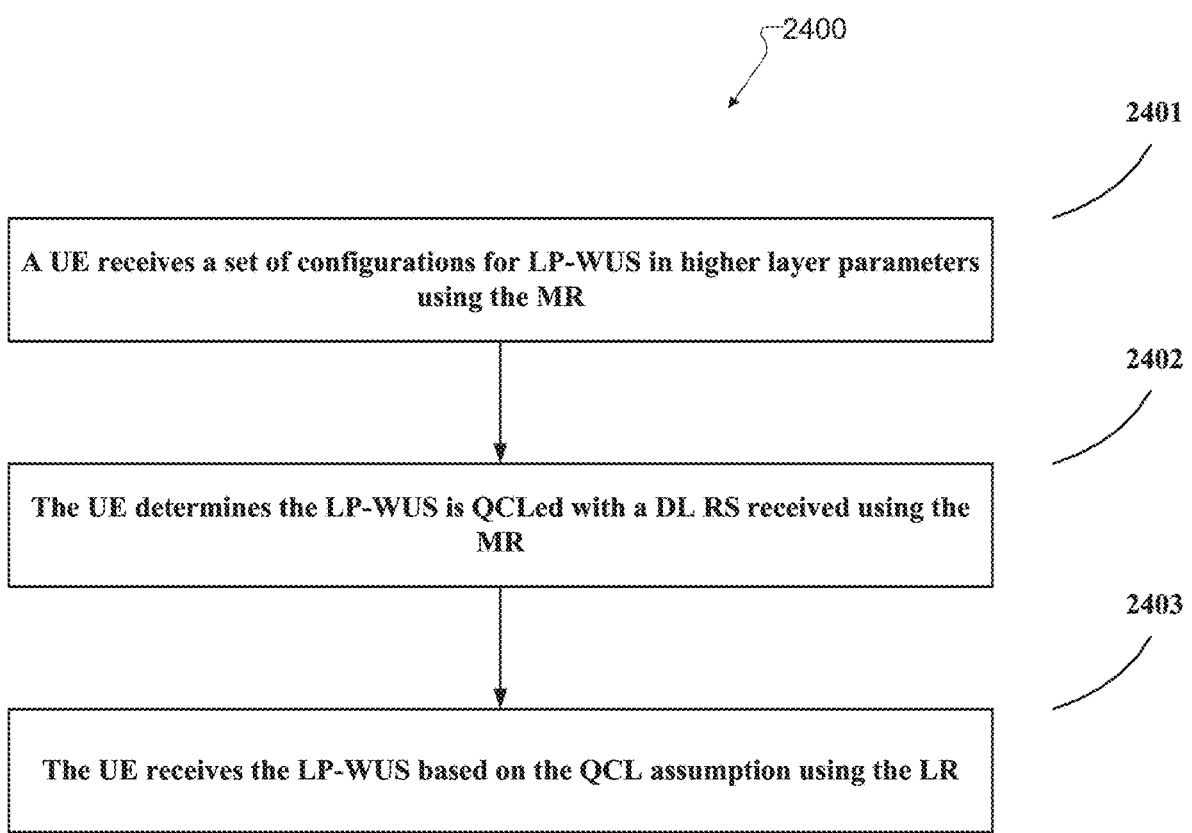
FIG. 24 illustrates a flowchart of an example UE procedure for receiving LP-WUS according to embodiments of the present disclosure.

FIG. 24 illustrates a flowchart of an example UE procedure 2400 for receiving LP-WUS according to embodiments of the present disclosure. For example. Procedure 2400 for receiving LP-WUS can be performed by the UE 116 of FIG. 3. This example is for illustration only and other embodiments can be used without departing from the scope of the present disclosure.

The procedure begins in 2401, a UE receives a set of configurations for LP-WUS in higher layer parameters using the MR. In 2402, the UE 116 determines the LP-WUS is QCLed with a DL RS received using the MR. In 2403, the UE 116 receives the LP-WUS based on the QCL assumption using the LR.

In one sub-embodiment, with reference to FIG. 23, an example UE procedure at least in RRC_IDLE and/or RRC_INACTIVE on determining the QCL assumption for the set of signals is shown and, with reference to FIG. 24, an example UE procedure in RRC_CONNECTED on determining the QCL assumption for the set of signals is shown.

In one embodiment, a type of signals (e.g., with low reception power) can be supported, wherein a first part of the type of signals can be used to support synchronization functionality and a second part of the type of signals can be used to support wake-up indication functionality. The first part of the type of signals can be denoted as LP-WUS-1 and the second part of the type of signals can be denoted as LP-WUS-2.

For one instance, an instant of the transmission of LP-WUS-2 carries at least information on whether a main receiver needs to wake up to receive signal/channel.

For another instance, an instant of the transmission of LP-WUS-1 carries at least information on an identification and/or timing.

For yet another instance, the reception of the type of signals can be performed by a secondary receiver different from a main receiver (e.g., denoted as MR), wherein the secondary receiver can operate with low power consumption (e.g., denoted as LR).

For yet another instance, the multiplexing of the two parts of the type of signals can be fixed. For one sub-instance, the OFDM symbol(s) for LP-WUS-1 and the OFDM symbol(s) for LP-WUS-2 are consecutive.

For yet another instance, if the LP-WUS-2 does not need to wake up the MR to receive signal/channel, the transmission of LP-WUS-2 can be absent.

In one sub-embodiment, at least one of the following example on determining the QCL assumption and/or TCI state can be supported.

In one example, a UE assumes the first part of the set of signals (e.g., LP-WUS-1) and the second part of the set of signals (e.g., LP-WUS-2) associated with the same transmission instance are QCLed.

Figure 25:
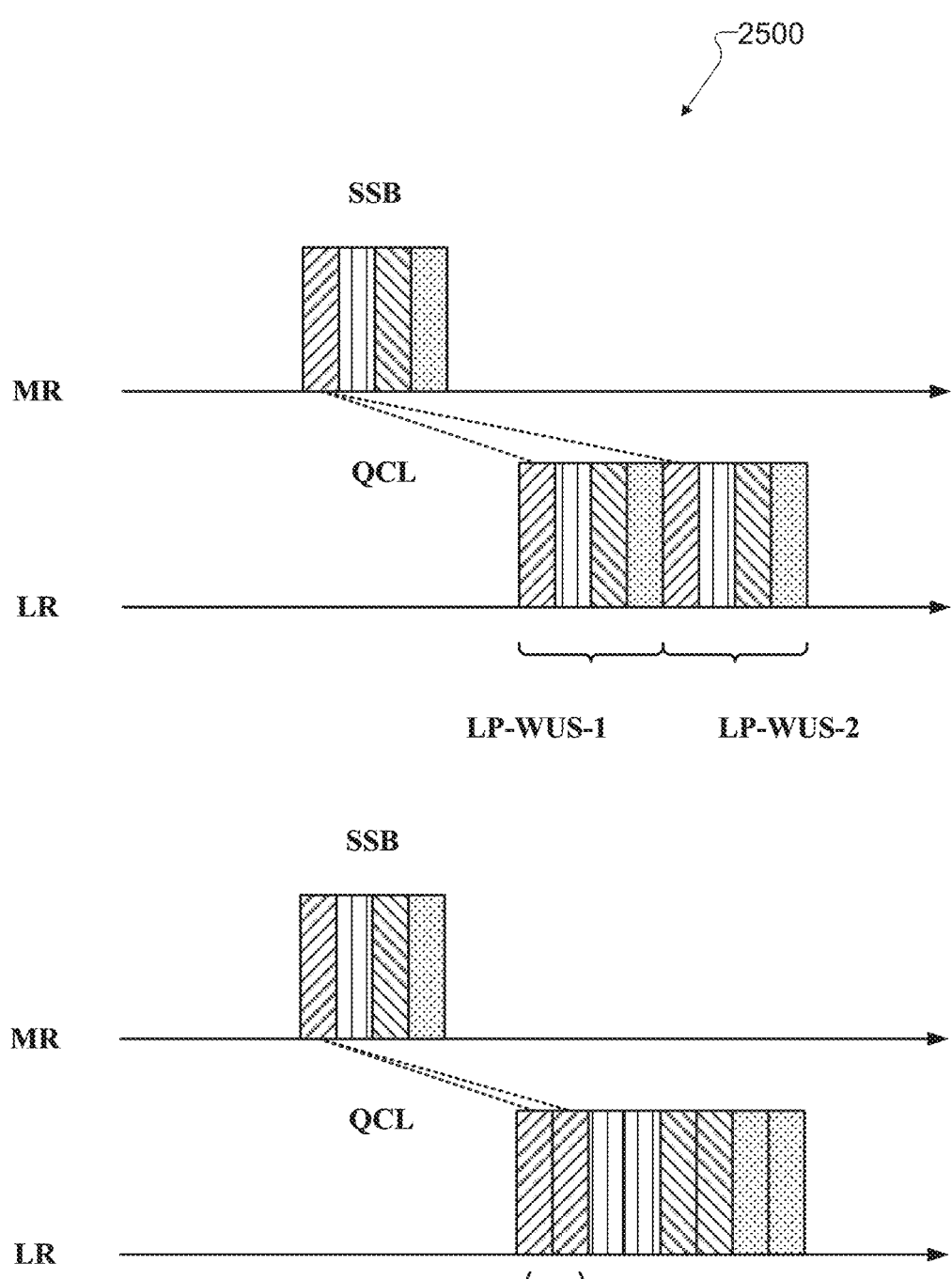
FIG. 25 illustrates a diagram of example QCL assumptions for LP-WUS-1 and LP-WUS-2 according to embodiments of the present disclosure.

FIG. 25 illustrates a diagram 2500 of example QCL assumptions for LP-WUS-1 and LP-WUS-2 according to embodiments of the present disclosure. For example, diagram 2500 of example QCL assumptions for LP-WUS-1 and LP-WUS-2 can be utilized by any of the UEs 111-116 of FIG. 1. This example is for illustration only and other embodiments can be used without departing from the scope of the present disclosure.

In one example, the transmission of the set of signals can be according to a burst including one or multiple transmission instances within the burst.

For one sub-example, the burst includes two sub-bursts: a first sub-burst includes one or multiple transmission instances for LP-WUS-1, and a second sub-burst includes one or multiple transmission instances for LP-WUS-2. In one instance of this sub-example, the i-th instance for LP-WUS-1 in the first sub-burst can be QCLed with an i-th instance of SS/PBCH block in a burst, wherein the SS/PBCH block can be received using the MR. In another instance of this sub-example, the i-th instance for LP-WUS-2 in the second sub-burst can be QCLed with an i-th instance of SS/PBCH block in a burst, wherein the SS/PBCH block can be received using the MR. In yet another instance of this sub-example, the i-th instance for LP-WUS-1 in the first sub-burst can be QCLed with the i-th instance for LP-WUS-2 in the second sub-burst. In yet another instance of this sub-example, the number of instances for LP-WUS-1 in the first sub-burst and/or the number of instances for LP-WUS-2 in the second sub-burst can be same as the number of SS/PBCH blocks in the burst. In yet another instance of this sub-example, the example QCL assumption can be applicable at least for RRC_IDLE and/or RRC_INACTIVE mode.

For another sub-example, the burst includes one or multiple transmission instances, and each transmission instances includes both the LP-WUS-1 and LP-WUS-2. In one instance of this sub-example, the LP-WUS-1 in the i-th instance within the burst can be QCLed with an i-th instance of SS/PBCH block in a burst, wherein the SS/PBCH block can be received using the MR. In another instance of this sub-example, the LP-WUS-2 in the i-th instance within the burst can be QCLed with an i-th instance of SS/PBCH block in a burst, wherein the SS/PBCH block can be received using the MR. In yet another instance of this sub-example, the LP-WUS-1 and LP-WUS-2 in the same transmission instance can be QCLed. In yet another instance of this sub-example, the number of instances in the burst for LP-WUS-1 and LP-WUS-2 can be same as the number of SS/PBCH blocks in the burst. In yet another instance of this sub-example, the example QCL assumption can be applicable at least for RRC_IDLE and/or RRC_INAC-TIVE mode.

Figure 26:
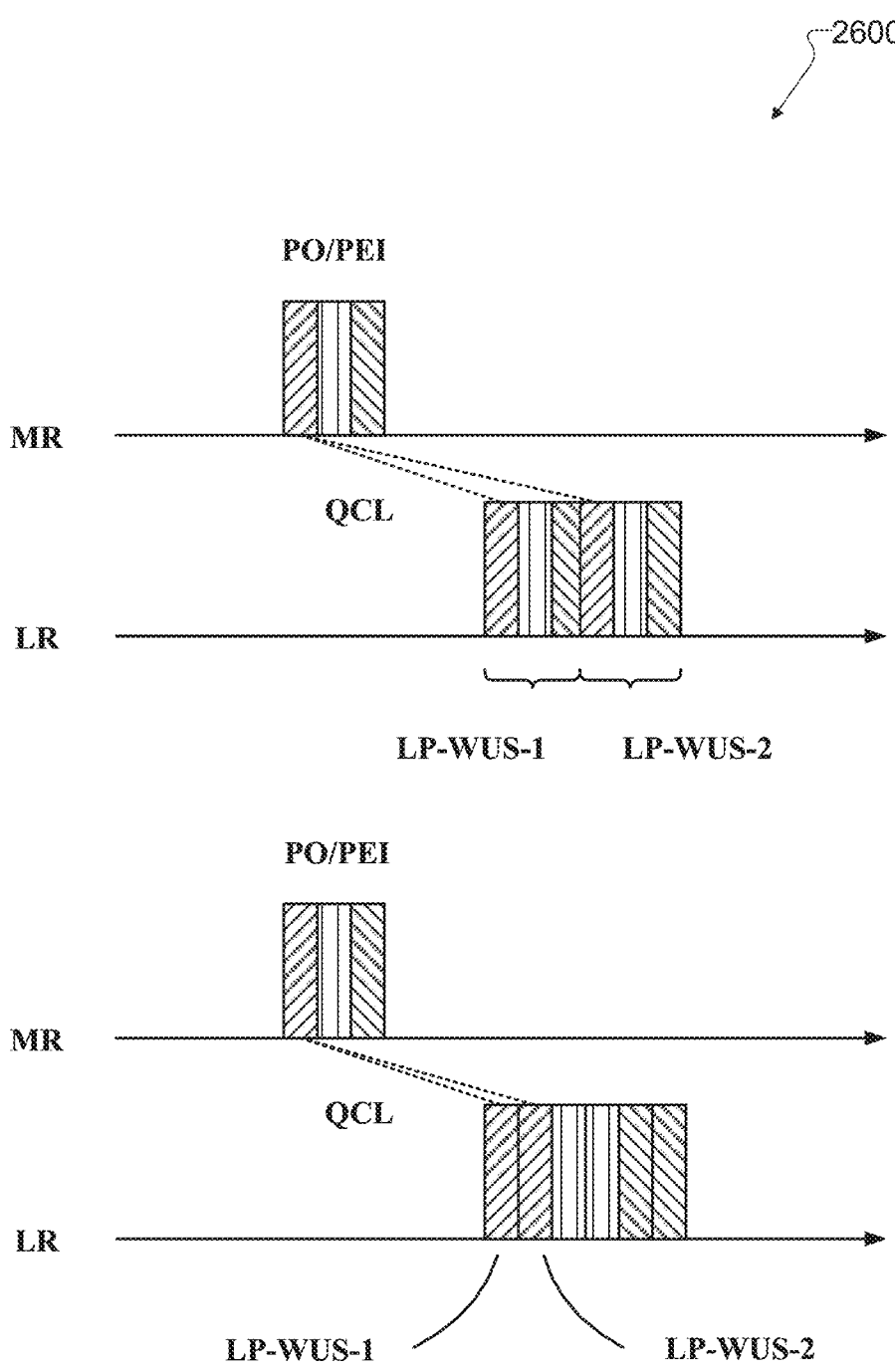
FIG. 26 illustrates a diagram of example QCL assumptions for LP-WUS-1 and LP-WUS-2 according to embodiments of the present disclosure.

FIG. 26 illustrates a diagram 2600 of example QCL assumptions for LP-WUS-1 and LP-WUS-2 according to embodiments of the present disclosure. For example, diagram 2600 of example QCL assumptions for LP-WUS-1 and LP-WUS-2 can be utilized by any of the UEs 111-116 of FIG. 1. This example is for illustration only and other embodiments can be used without departing from the scope of the present disclosure.

In another example, the transmission of the set of signals can be according to a burst including one or multiple transmission instances within the burst.

For one sub-example, the burst includes two sub-bursts: a first sub-burst includes one or multiple transmission instances for LP-WUS-1 and a second sub-burst includes one or multiple transmission instances for LP-WUS-2. In one instance of this sub-example, the i-th instance for LP-WUS-1 in the first sub-burst can be QCLed with a RS of PDCCH associated with an i-th instance of a PO and/or a PEI in a burst, wherein the PDCCH of paging/PEI can be received by the MR. In another instance of this sub-example, the i-th instance for LP-WUS-2 in the second sub-burst can be QCLed with a RS of PDCCH associated with an i-th instance of a PO and/or a PEI in a burst, wherein the PDCCH of paging/PEI can be received by the MR. In yet another instance of this sub-example, the i-th instance for LP-WUS-1 in the first sub-burst can be QCLed with the i-th instance for LP-WUS-2 in the second sub-burst. In yet another instance of this sub-example, the number of instances for LP-WUS-1 in the first sub-burst and/or the number of instances for LP-WUS-2 in the second sub-burst can be same as the number of actually transmitted SS/PBCH blocks in the burst (e.g., determined based on the indication in system information). In yet another instance of this sub-example, the example QCL assumption can be applicable at least for RRC_IDLE and/or RRC_INACTIVE mode.

For another sub-example, the burst includes one or multiple transmission instances, and each transmission instances includes both the LP-WUS-1 and LP-WUS-2. In one instance of this sub-example, the LP-WUS-1 in the i-th instance within the burst can be QCLed with a RS of PDCCH associated with an i-th instance of a PO and/or a PEI in a burst, wherein the PDCCH of paging/PEI can be received by the MR. In another instance of this sub-example, the LP-WUS-2 in the i-th instance within the burst can be QCLed with a RS of PDCCH associated with an i-th instance of a PO and/or a PEI in a burst, wherein the PDCCH of paging/PEI can be received by the MR. In yet another instance of this sub-example, the LP-WUS-1 and LP-WUS-2 in the same transmission instance can be QCLed. In yet another instance of this sub-example, the number of instances in the burst for LP-WUS-1 and LP-WUS-2 can be same as the number of actually transmitted SS/PBCH blocks in the burst (e.g., determined based on the indication in system information). In yet another instance of this sub-example, the example QCL assumption can be applicable at least for RRC_IDLE and/or RRC_INACTIVE mode.

Figure 27:
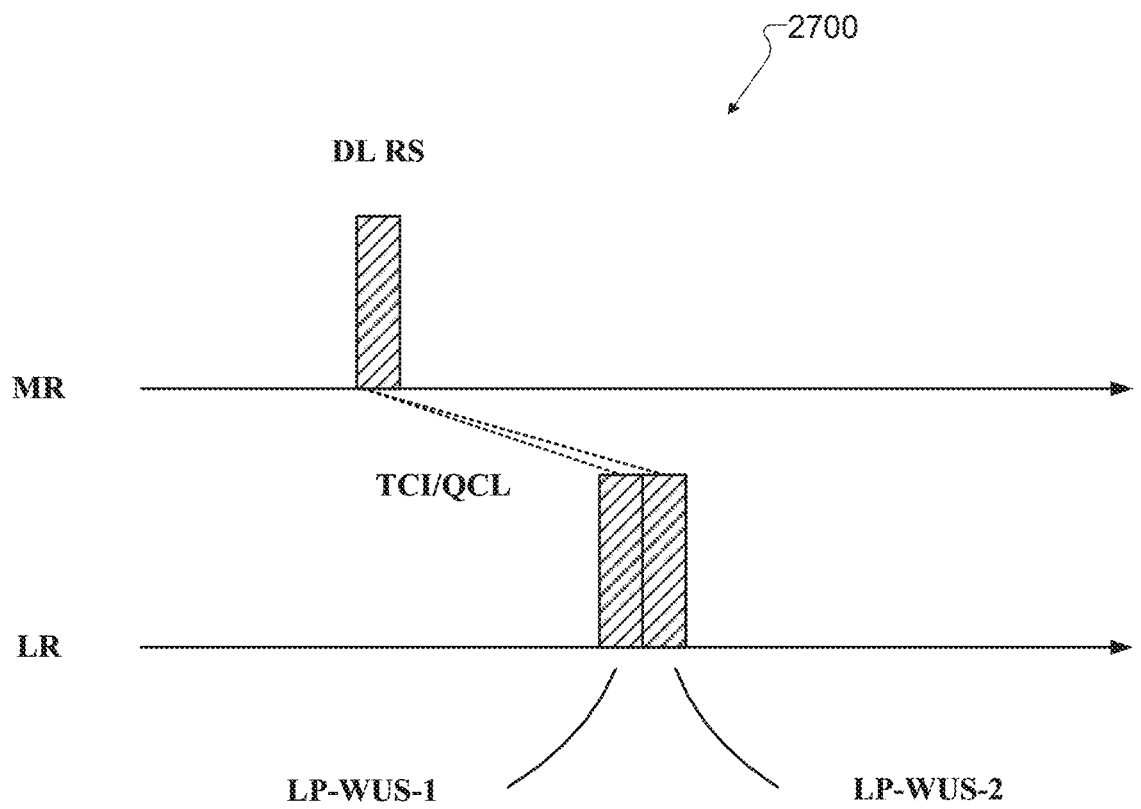
FIG. 27 illustrates a diagram of example QCL assumptions for LP-WUS-1 and LP-WUS-2 according to embodiments of the present disclosure.

FIG. 27 illustrates a diagram 2700 of example QCL assumptions for LP-WUS-1 and LP-WUS-2 according to embodiments of the present disclosure. For example, diagram 2700 of example QCL assumptions for LP-WUS-1 and LP-WUS-2 can be utilized by any of the UEs 111-116 of FIG. 1. This example is for illustration only and other embodiments can be used without departing from the scope of the present disclosure.

In yet another example, the transmission of the set of signals (e.g., including LP-WUS-1 and LP-WUS-2) can be QCLed with or using the same TCI state with a downlink RS, wherein the DL RS can be received by the MR. In one instance of this example, the example QCL assumption and/or TCI state can be applicable at least for RRC_CON-NECTED mode. In another instance of this example, the QCL assumption and/or TCI state can be provided to the UE 116 by a higher layer parameter.

Figure 28:
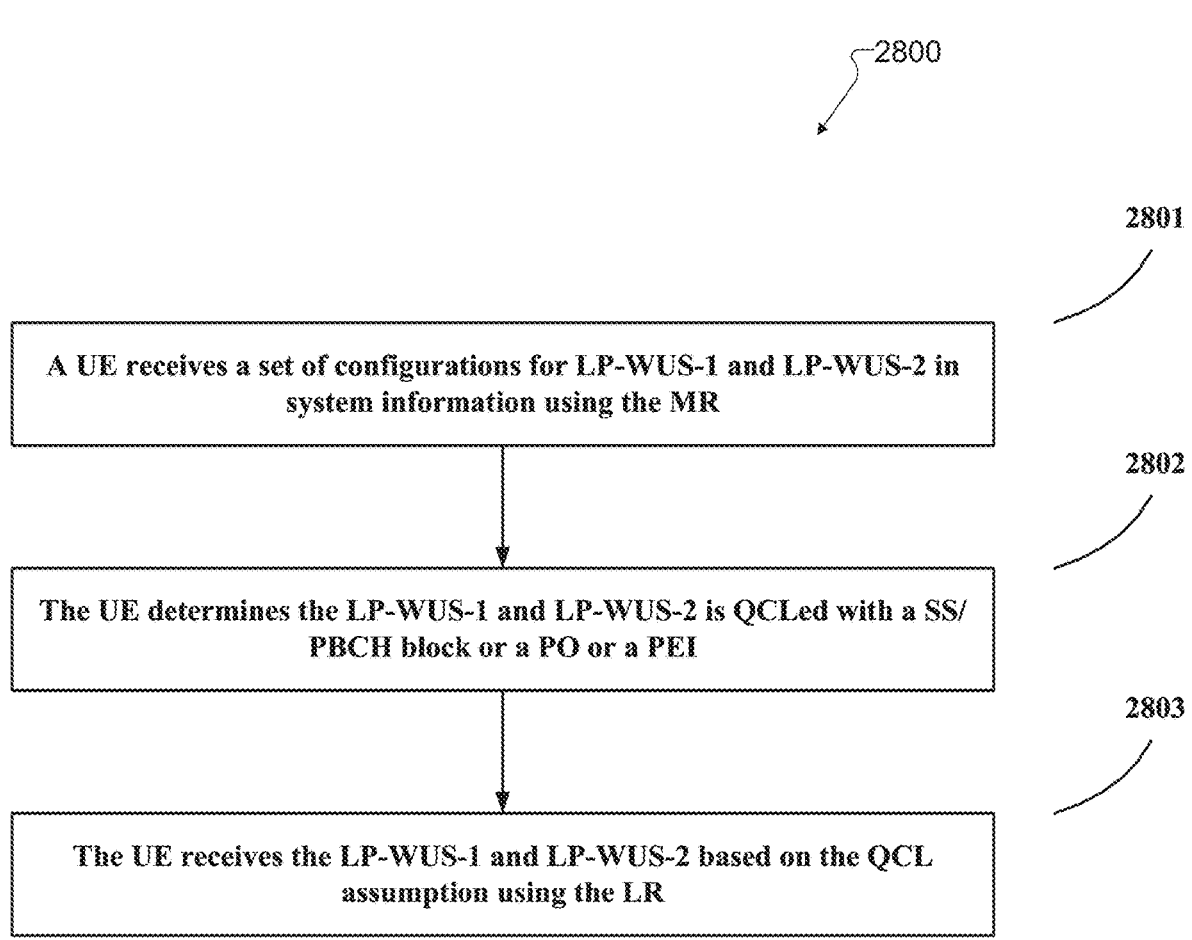
FIG. 28 illustrates a flowchart of an example UE procedure for receiving LP-WUS-1 and LP-WUS-2 according to embodiments of the present disclosure.

FIG. 28 illustrates a flowchart of an example UE procedure 2800 for receiving LP-WUS-1 and LP-WUS-2 according to embodiments of the present disclosure. For example, procedure 2800 for receiving LP-WUS-1 and LP-WUS-2 can be performed by the UE 116 of FIG. 3. This example is for illustration only and other embodiments can be used without departing from the scope of the present disclosure.

The procedure begins in 2801, a UE receives a set of configurations for LP-WUS-1 and LP-WUS-2 in system information using the MR. In 2802, the UE 116 determines the LP-WUS-1 and LP-WUS-2 is QCled with a SS/PBCH block, PO, or PEI. In 2803, the UE 116 receives the LP-WUS-1 and LP-WUS-2 based on the QCL assumption using the LR.

Figure 29:
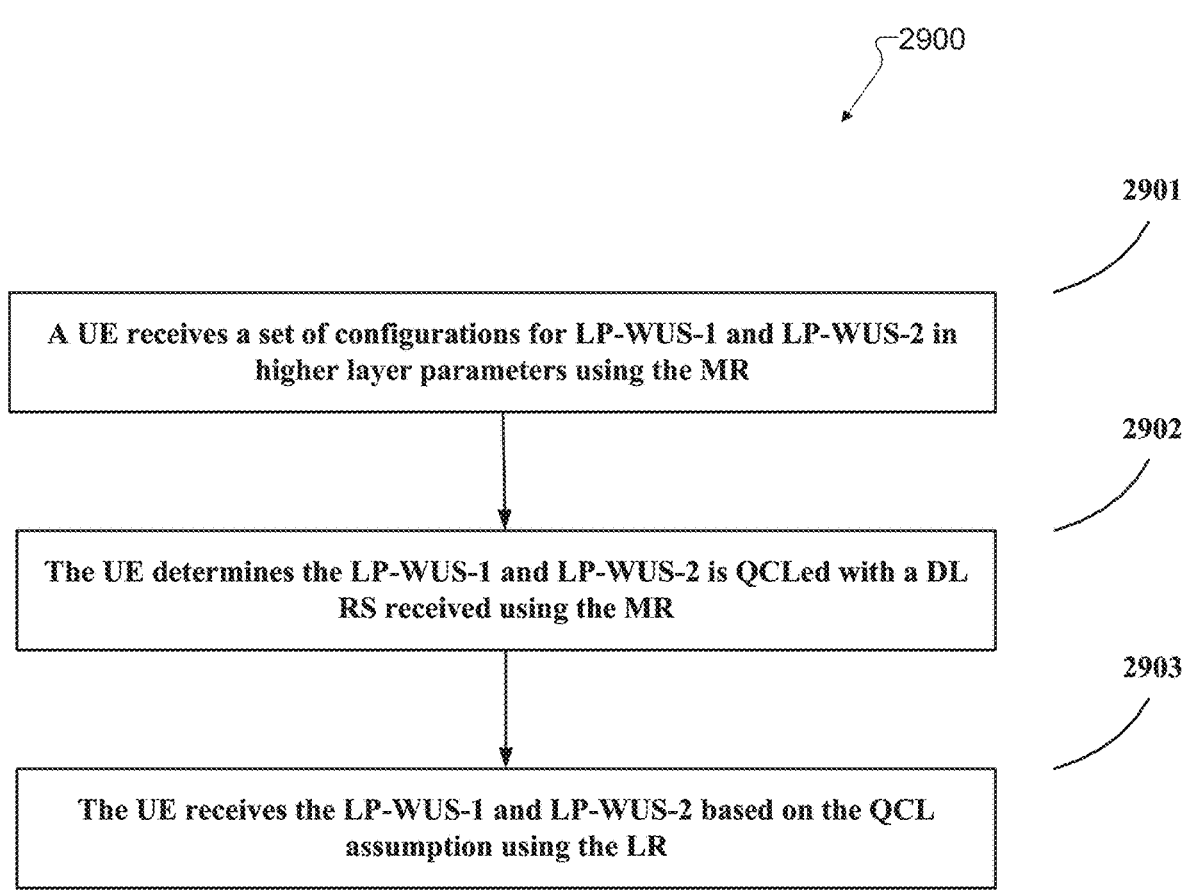
FIG. 29 illustrates a flowchart of an example UE procedure for receiving LP-WUS-1 and LP-WUS-2 according to embodiments of the present disclosure.

FIG. 29 illustrates a flowchart of an example UE procedure 2900 for receiving LP-WUS-1 and LP-WUS-2 according to embodiments of the present disclosure. For example, procedure 2900 for receiving LP-WUS-1 and LP-WUS-2 can be performed by any of the UEs 111-116 of FIG. 1. This example is for illustration only and other embodiments can be used without departing from the scope of the present disclosure.

The procedure begins in 2901, a UE receives a set of configurations for LP-WUS-1 and LP-WUS-2 in higher parameters using the MR. In 2902, the UE 116 determines the LP-WUS-1 and LP-WUS-2 is QCLed with a DL RS received using the MR. In 2903, the UE 116 receives the LP-WUS-1 and LP-WUS-2 based on the QCL assumption using the LR.

In one sub-embodiment, with reference to FIG. 28, an example UE procedure at least in RRC_IDLE and/or RRC_INACTIVE on determining the QCL assumption for the set of signals is shown and, with reference to FIG. 29, an example UE procedure in RRC_CONNECTED on determining the QCL assumption for the set of signals is shown.

In one embodiment, two types of signals (e.g., both with low reception power by using a waveform that enables low power receiver)) can be supported, wherein a first type of signals can be used to support the synchronization function-ality (e.g. for at least one of a time domain and/or a frequency domain synchronization), and a second type of signals can be used to support the wake-up indication functionality (e.g., indicating a main receiver with higher reception power to wake up). The first type of signal can be denoted as LP-SYNC, and/or the second type of signal can be denoted as LP-WUS.

For one instance, an instant of the transmission of LP-WUS carries at least information on whether a main receiver needs to wake up to receive signal/channel.

For another instance, an instant of the transmission of LP-SYNC carries at least information on an identification and/or timing.

For yet another instance, the reception of the two types of signals can be performed by a secondary receiver different from a main receiver (e.g., denoted as MR), wherein the secondary receiver can operate with low power consumption (e.g., denoted as LR).

For yet another instance, if the LP-WUS does not need to wake up the MR to receive signal/channel, the transmission of LP-WUS can be absent.

In one sub-embodiment, at least one of the following example on determining the QCL assumption and/or TCI state can be supported.

In one example, a UE assumes the first type of signals (e.g., LP-SYNC) and the second type of signals (e.g., LP-WUS) associated with the same instance for transmission or associated based on a configuration or associated based on a determination from the UE are QCLed.

In another example, a UE assumes the first type of signals (e.g., LP-SYNC) and the second type of signals (e.g., LP-WUS) can use QCL assumption and/or TCI state separately, e.g., each of them is according to an example in this disclosure.

Figure 30:
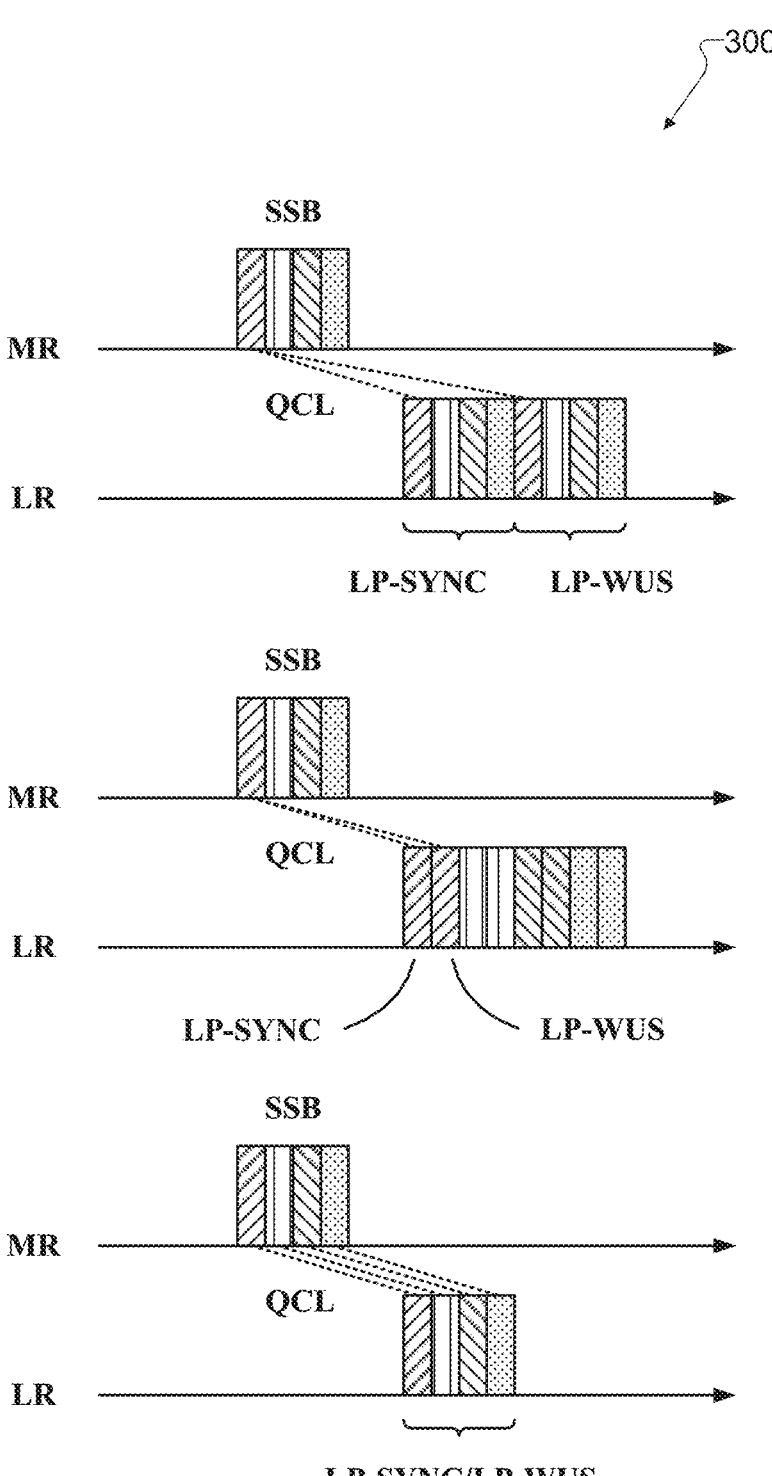
FIG. 30 illustrates a diagram of example QCL assumptions for LP-SYNC and LP-WUS according to embodiments of the present disclosure.

FIG. 30 illustrates a diagram 3000 of example QCL assumptions for LP-SYNC and LP-WUS according to embodiments of the present disclosure. For example, diagram 3000 of example QCL assumptions for LP-SYNC and LP-WUS can be utilized by any of the UEs 111-116 of FIG. 1. This example is for illustration only and other embodiments can be used without departing from the scope of the present disclosure.

In one example, the transmission of at least one of the two types of signals can be according to a burst including one or multiple transmission instances within the burst.

For one sub-example, the burst includes two sub-bursts: a first sub-burst includes one or multiple transmission instances for LP-SYNC and a second sub-burst includes one or multiple transmission instances for LP-WUS. In one instance of this sub-example, the i-th instance for LP-SYNC in the first sub-burst can be QCLed with an i-th instance of SS/PBCH block in a burst, wherein the SS/PBCH block can be received using the MR. In another instance of this sub-example, the i-th instance for LP-WUS in the second sub-burst can be QCLed with an i-th instance of SS/PBCH block in a burst, wherein the SS/PBCH block can be received using the MR. In yet another instance of this sub-example, the i-th instance for LP-SYNC in the first sub-burst can be QCLed with the i-th instance for LP-WUS in the second sub-burst. In yet another instance of this sub-example, the number of instances for LP-SYNC in the first sub-burst and/or the number of instances for LP-WUS in the second sub-burst can be same as the number of SS/PBCH blocks in the burst. In yet another instance of this sub-example, the example QCL assumption can be applicable at least for RRC_IDLE and/or RRC_INACTIVE mode. In yet another instance of this sub-example, the SS/PBCH blocks are determined based on candidate SS/PBCH block occasions within a half frame. In yet another instance of this sub-example, the SS/PBCH blocks are determined based on actually transmitted SS/PBCH block indicated by higher layer parameter (e.g., ssb-PositionsInBurst included in SIB1 and/or in dedicated RRC parameter).

For another sub-example, the burst includes one or multiple transmission instances and each transmission instances includes both the LP-SYNC and LP-WUS. In one instance of this sub-example, the LP-SYNC in the i-th instance within the burst can be QCLed with an i-th instance of SS/PBCH block in a burst, wherein the SS/PBCH block can be received using the MR. In another instance of this sub-example, the LP-WUS in the i-th instance within the burst can be QCLed with an i-th instance of SS/PBCH block in a burst, wherein the SS/PBCH block can be received using the MR. In yet another instance of this sub-example, the LP-SYNC and LP-WUS in the same transmission instance can be QCLed. In yet another instance of this sub-example, the number of instances in the burst for LP-SYNC and LP-WUS can be same as the number of SS/PBCH blocks in the burst. In yet another instance of this sub-example, the example QCL assumption can be applicable at least for RRC_IDLE and/or RRC_INACTIVE mode. In yet another instance of this sub-example, the SS/PBCH blocks are determined based on candidate SS/PBCH block occasions within a half frame. In yet another instance of this sub-example, the SS/PBCH blocks are determined based on actually transmitted SS/PBCH block indicated by higher layer parameter (e.g., ssb-PositionsInBurst included in SIB1 and/or in dedicated RRC parameter).

For yet another sub-example, the burst includes one or multiple transmission instances, and each transmission instances includes the LP-SYNC or LP-WUS. In one instance of this sub-example, the LP-SYNC or LP-WUS in the i-th instance within the burst can be QCLed with an i-th instance of SS/PBCH block in a burst, wherein the SS/PBCH block can be received using the MR. In yet another instance of this sub-example, the number of instances in the burst for LP-SYNC or LP-WUS can be same as the number of SS/PBCH blocks in the burst. In yet another instance of this sub-example, the example QCL assumption can be applicable at least for RRC_IDLE and/or RRC_INACTIVE mode. In yet another instance of this sub-example, the SS/PBCH blocks are determined based on candidate SS/PBCH block occasions within a half frame. In yet another instance of this sub-example, the SS/PBCH blocks are determined based on actually transmitted SS/PBCH block indicated by higher layer parameter (e.g., ssb-PositionsInBurst included in SIB1 and/or in dedicated RRC parameter).

Figure 31:
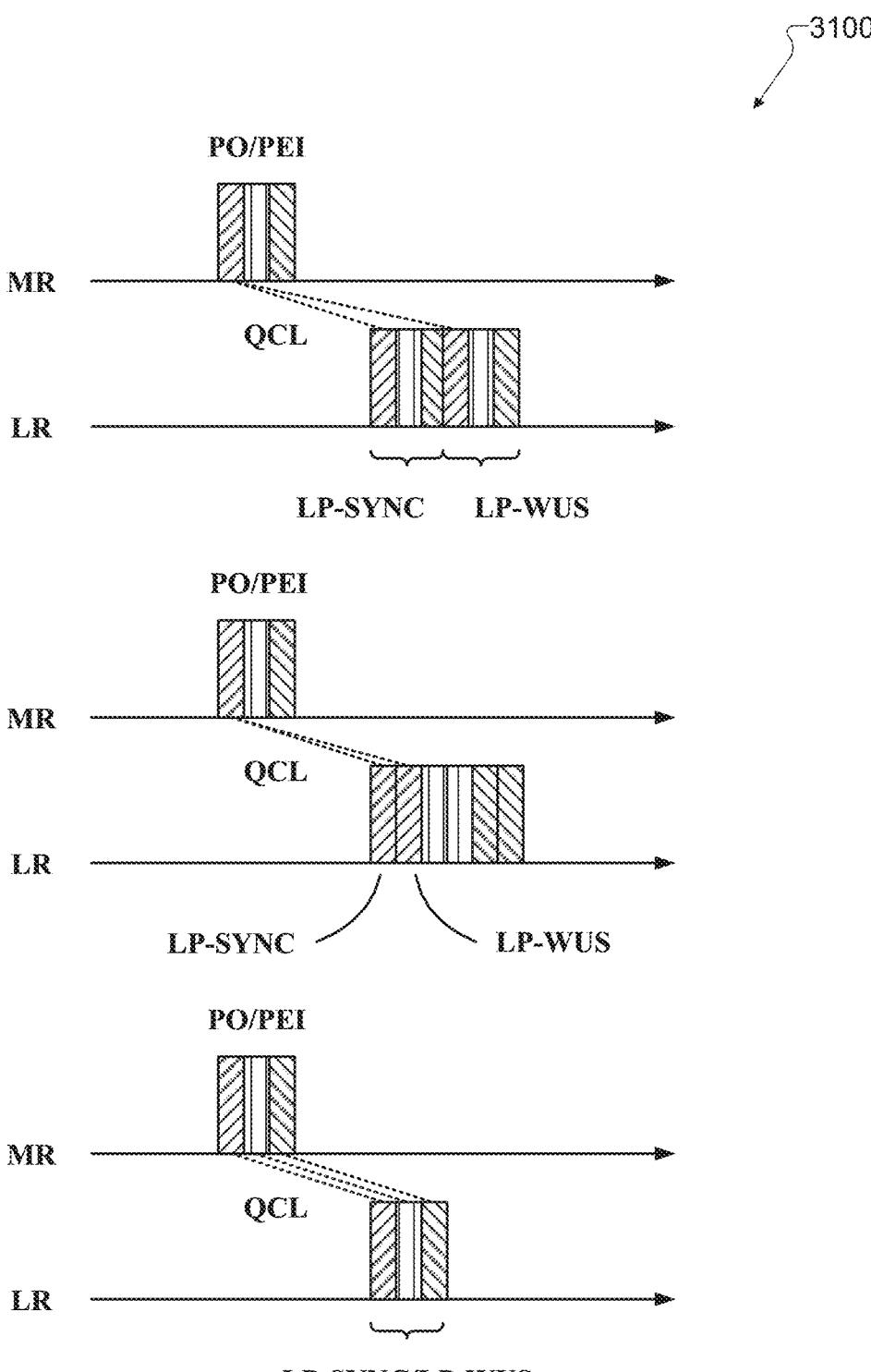
FIG. 31 illustrates a diagram of example QCL assumptions for LP-SYNC and LP-WUS according to embodiments of the present disclosure.

FIG. 31 illustrates a diagram 3100 of example QCL assumptions for LP-SYNC and LP-WUS according to embodiments of the present disclosure. For example, diagram 3100 of example QCL assumptions for LP-SYNC and LP-WUS can be utilized by any of the UEs 111-116 of FIG. 1. This example is for illustration only and other embodiments can be used without departing from the scope of the present disclosure.

In another example, the transmission of at least one of the two types of signals can be according to a burst including one or multiple transmission instances within the burst.

For one sub-example, the burst includes two sub-bursts: a first sub-burst includes one or multiple transmission instances for LP-SYNC and a second sub-burst includes one or multiple transmission instances for LP-WUS. In one instance of this sub-example, the i-th instance for LP-SYNC in the first sub-burst can be QCLed with a RS of PDCCH associated with an i-th instance of a PO and/or a PEI in a burst, wherein the PDCCH of paging/PEI can be received by the MR. In another instance of this sub-example, the i-th instance for LP-WUS in the second sub-burst can be QCLed with a RS of PDCCH associated with an i-th instance of a paging occasion (PO) and/or a paging early indication (PEI) in a burst, wherein the PDCCH of paging/PEI can be received by the MR. In yet another instance of this sub-example, the i-th instance for LP-SYNC in the first sub-burst can be QCLed with the i-th instance for LP-WUS in the second sub-burst. In yet another instance of this sub-example, the number of instances for LP-SYNC in the first sub-burst and/or the number of instances for LP-WUS in the second sub-burst can be same as the number of actually transmitted SS/PBCH blocks in the burst (e.g., determined based on the indication in system information). In yet another instance of this sub-example, the example QCL assumption can be applicable at least for RRC_IDLE and/or RRC_INACTIVE mode.

For another sub-example, the burst includes one or multiple transmission instances, and each transmission instances includes both the LP-SYNC and LP-WUS. In one instance of this sub-example, the LP-SYNC in the i-th instance within the burst can be QCLed with a RS of PDCCH associated with an i-th instance of a PO and/or a PEI in a burst, wherein the PDCCH of paging/PEI can be received by the MR. In another instance of this sub-example, the LP-WUS in the i-th instance within the burst can be QCLed with a RS of PDCCH associated with an i-th instance of a PO and/or a PEI in a burst, wherein the PDCCH of paging/PEI can be received by the MR. In yet another instance of this sub-example, the LP-SYNC and LP-WUS in the same transmission instance can be QCLed. In yet another instance of this sub-example, the number of instances in the burst for LP-SYNC and LP-WUS can be same as the number of actually transmitted SS/PBCH blocks in the burst (e.g., determined based on the indication in system information). In yet another instance of this sub-example, the example QCL assumption can be applicable at least for RRC_IDLE and/or RRC_INACTIVE mode.

For yet another sub-example, the burst includes one or multiple transmission instances and each transmission instances includes the LP-SYNC or LP-WUS. In one instance of this sub-example, the LP-SYNC or LP-WUS in the i-th instance within the burst can be QCLed with a RS of PDCCH associated with an i-th instance of a PO and/or a PEI in a burst, wherein the PDCCH of paging/PEI can be received by the MR. In yet another instance of this sub-example, the number of instances in the burst for LP-SYNC or LP-WUS can be same as the number of actually transmitted SS/PBCH blocks in the burst (e.g., determined based on the indication in system information). In yet another instance of this sub-example, the example QCL assumption can be applicable at least for RRC_IDLE and/or RRC_INACTIVE mode.

Figure 32:
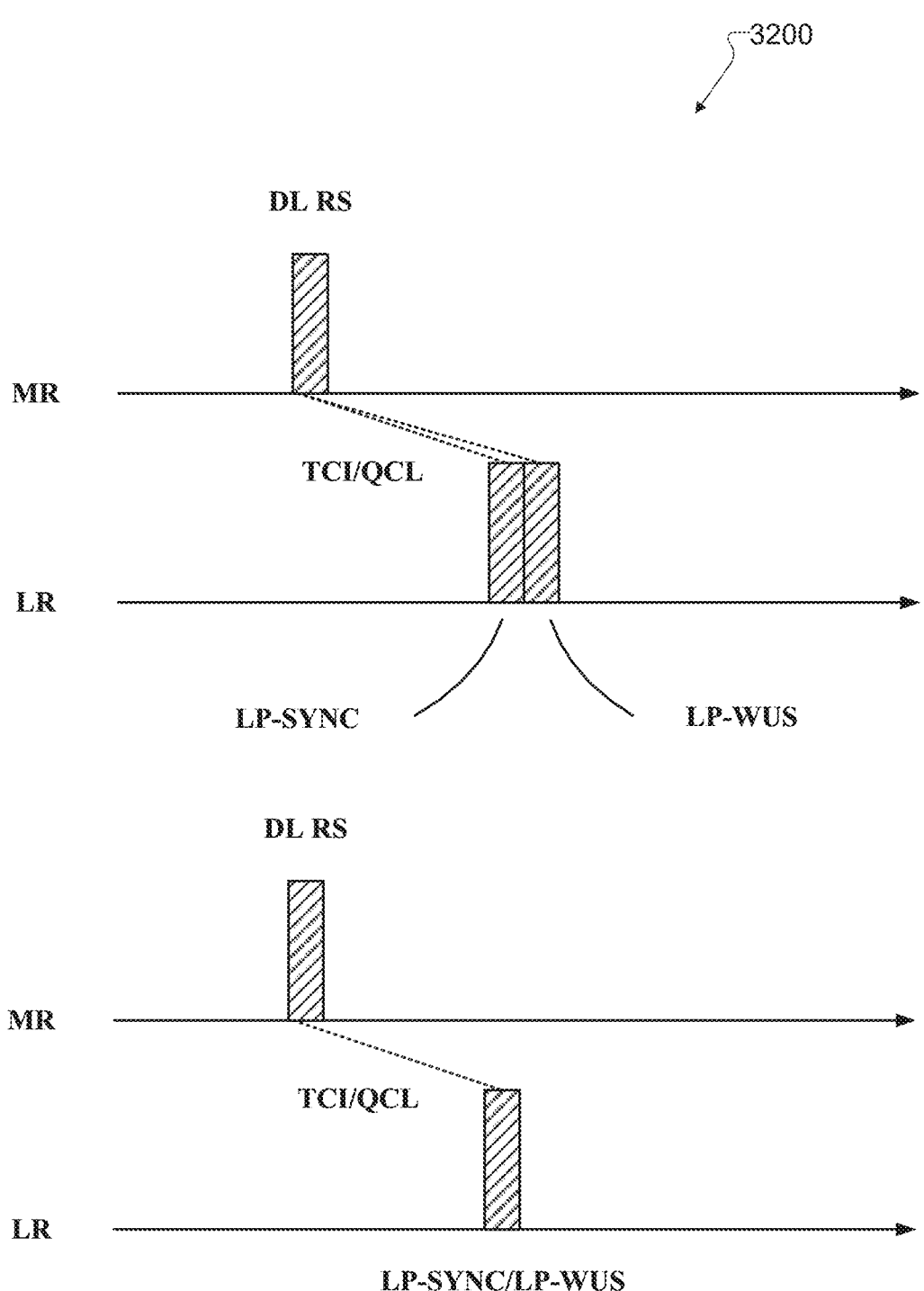
FIG. 32 illustrates a diagram of example QCL assumptions for LP-SYNC and LP-WUS according to embodiments of the present disclosure.

FIG. 32 illustrates a diagram 3200 of example QCL assumptions for LP-SYNC and LP-WUS according to embodiments of the present disclosure. For example, diagram 3200 of example QCL assumptions for LP-SYNC and LP-WUS cam be utilized by any of the UEs 111-116 of FIG. 1. This example is for illustration only and other embodiments can be used without departing from the scope of the present disclosure.

In yet another example, the transmission of at least one of the two types of signals (e.g., including LP-SYNC and LP-WUS) can be QCLed with or using the same TCI state with a downlink RS, wherein the DL RS can be received by the MR. In one instance of this example, the example QCL assumption and/or TCI state can be applicable at least for RRC_CONNECTED mode. In another instance of this example, the QCL assumption and/or TCI state can be provided to the UE 116 by a higher layer parameter. For instance, the downlink RS can be a SS/PBCH block. For another instance, the downlink RS can be a CSI-RS.

For one sub-example, both LP-SYNC and LP-WUS are transmitted in one transmission instance, and both can be QCLed with or using the same TCI state with the downlink RS.

For another sub-example, either LP-SYNC or LP-WUS is transmitted in one transmission instance and the transmitted type of signal can be QCLed with or using the same TCI state with the downlink RS.

Figure 33:
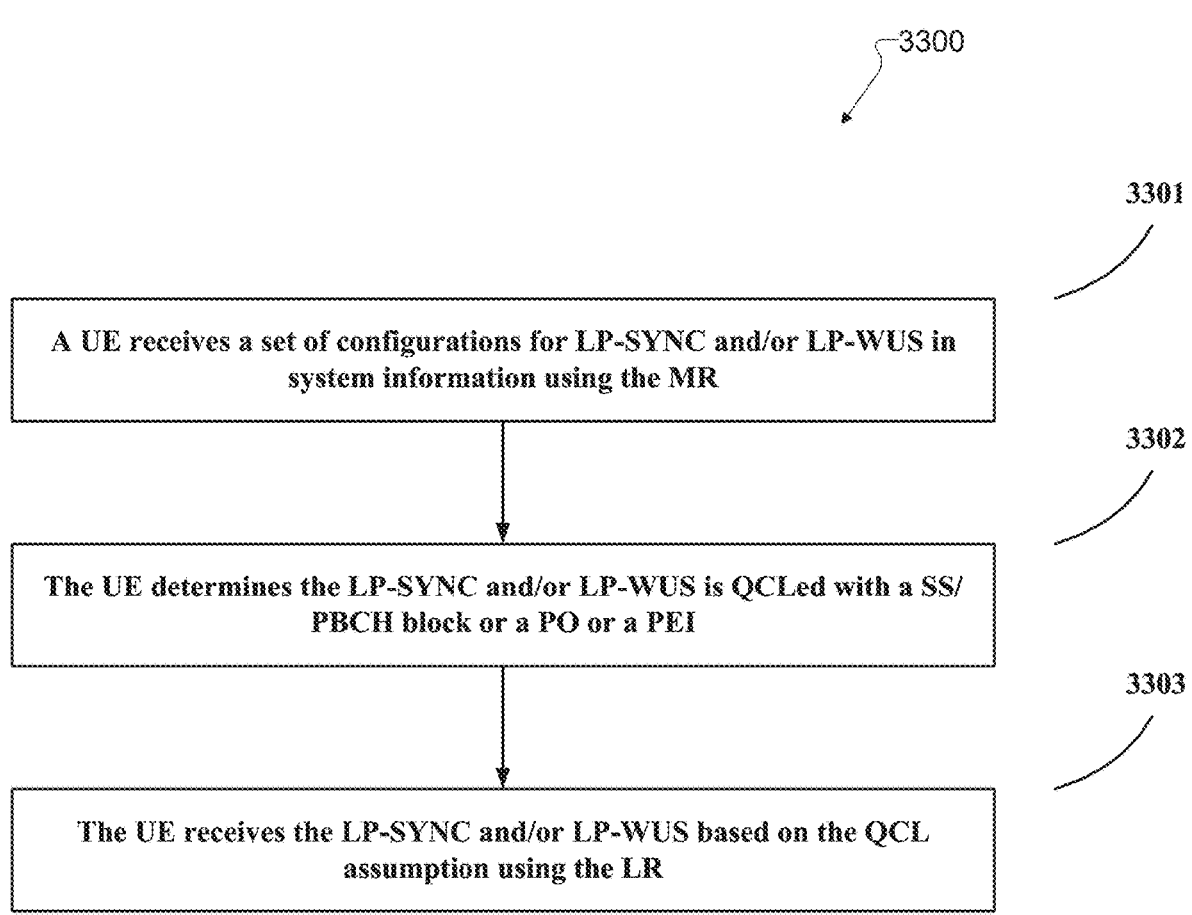
FIG. 33 illustrates a flowchart of an example UE procedure for receiving LP-WUS and/or LP-WUS according to embodiments of the present disclosure.

FIG. 33 illustrates a flowchart of an example UE procedure 3300 for receiving LP-WUS and/or LP-WUS according to embodiments of the present disclosure. For example, procedure 3300 for receiving LP-WUS and/or LP-WUS can be performed by any of the UEs 111-116 of FIG. 1. This example is for illustration only and other embodiments can be used without departing from the scope of the present disclosure.

The procedure begins in 3301, a UE receives a set of configurations for LP-SYNC and/or LP-WUS in system information using the MR. In 3302, the UE 116 determines the LP-SYNC and/or LP-WUS is QCLed with a SS/PBCH block, PO, or PEI. In 3303, the UE 116 receives the LP-SYNC and/or LP-WUS based on the QCL assumption using the LR.

Figure 34:
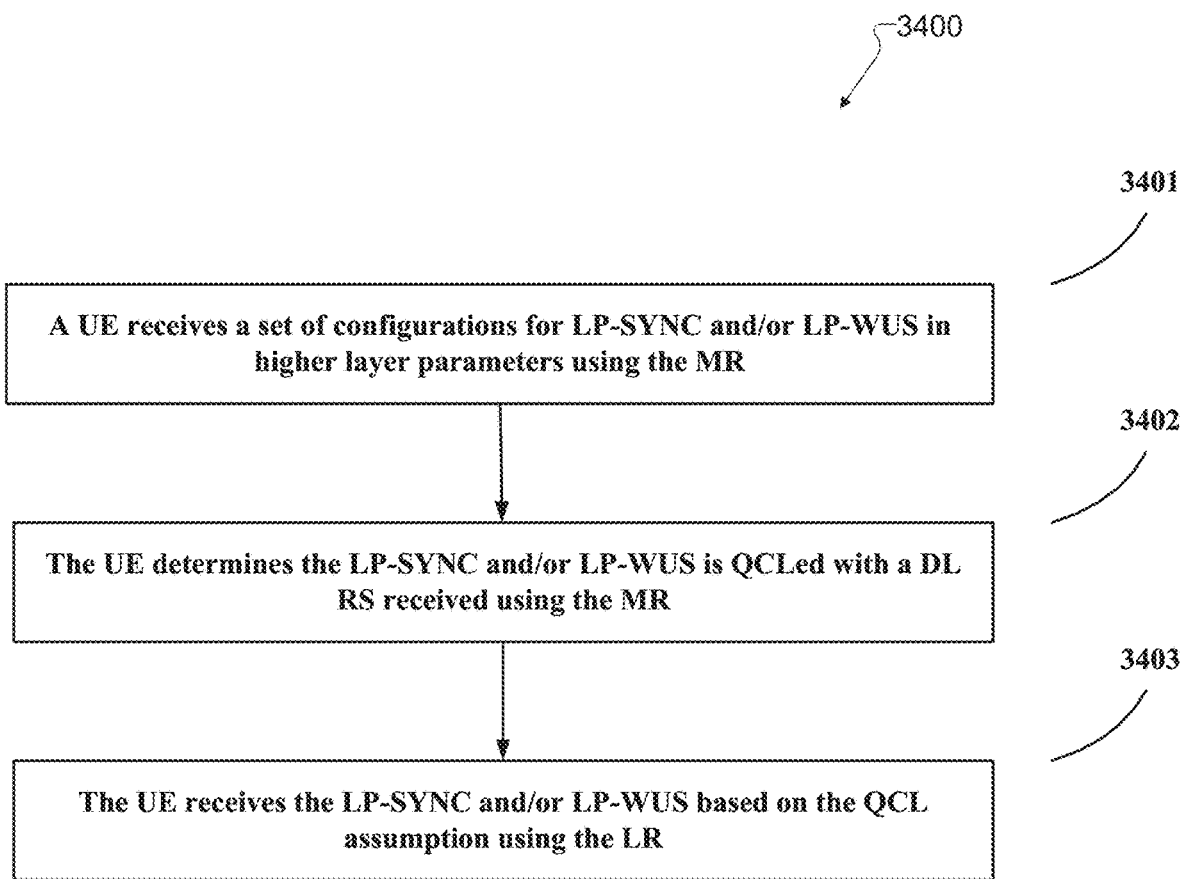
FIG. 34 illustrates a flowchart of an example UE procedure for receiving LP-SYNC and/or LP-WUS according to embodiments of the present disclosure.

FIG. 34 illustrates a flowchart of an example UE procedure 3400 for receiving LP-SYNC and/or LP-WUS according to embodiments of the present disclosure. For example, procedure 3400 for receiving LP-SYNC and/or LP-WUS can be performed by the UE 116 of FIG. 3. This example is for illustration only and other embodiments can be used without departing from the scope of the present disclosure.

The procedure begins in 3401, a UE receives a set of configurations for LP-SYNC and/or LP-WUS in higher layer parameters using MR. In 3402, the UE 116 determines the LP-SYNC and/or LP-WUS is QCLed with a DL RS received by the MR. In 3403, the UE 116 receives the LP-SYNC and/or LP-WUS based on the QCL assumption using the LR.

In one sub-embodiment, with reference to FIG. 33, an example UE procedure at least in RRC_IDLE and/or RRC_INACTIVE on determining the QCL assumption for the set of signals is shown and, with reference to FIG. 34, an example UE procedure in RRC_CONNECTED on determining the QCL assumption for the set of signals is shown.

Any of the above variation embodiments can be utilized independently or in combination with at least one other variation embodiment. The above flowchart illustrates example methods that can be implemented in accordance with the principles of the present disclosure and various changes could be made to the methods illustrated in the flowchart herein. For example, while shown as a series of steps, various steps in each figure could overlap, occur in parallel, occur in a different order, or occur multiple times. In another example, steps may be omitted or replaced by other steps.

Although the present disclosure has been described with exemplary embodiments, various changes and modifications may be suggested to one skilled in the art. It is intended that the present disclosure encompass such changes and modifications as fall within the scope of the appended claims. None of the descriptions in this application should be read as implying that any particular element, step, or function is an essential element that must be included in the claims scope. The scope of patented subject matter is defined by the claims.

What is claimed is:

1. A user equipment (UE) in a wireless communication system, the UE comprising:

a transceiver configured to receive configurations for occasions to receive first and second types of low power signals; and a processor operably coupled to the transceiver, the processor configured to determine, based on the configurations:

a first set of periodic occasions to receive the first type of low power signal; and a second set of non-periodic occasions to receive the second type of low power signal, wherein the transceiver is further configured to receive the first type of low power signal and the second type of low power signal, and wherein the processor is further configured to perform, based on the first type of low power signal, at least one of a synchronization measurement and a radio resource management (RRM) measurement.

2. The UE of claim 1, wherein the processor is further configured to determine whether to wake up based on the second type of low power signal.

3. The UE of claim 1, wherein the configurations for the occasions to receive the first type of low power signal include at least one of a periodicity, an interval between consecutive occasions, and a number of occasions within the periodicity.

4. The UE of claim 1, wherein:

the configurations for the occasions to receive the second type of low power signal include at least one of a time period and an interval between consecutive occasions, and the second set of non-periodic occasions to receive the second type of low power signal are within the time period.

5. The UE of claim 1, wherein the processor is further configured to determine a quasi-co-location (QCL) assumption for receiving the first type of low power signal.

6. The UE of claim 5, wherein each occasion within the first set of periodic occasions to receive the first type of low power signal is quasi-co-located (QCLed) with a synchronization signals and physical broadcast channel (SS/PBCH) block.

7. The UE of claim 6, wherein the SS/PBCH block is determined as an actually transmitted SS/PBCH block based on an indication in a system information block 1 (SIB1).

8. A base station (BS) in a wireless communication system, the BS comprising:

a processor configured to determine:

a first set of periodic occasions to transmit a first type of low power signal;

a second set of non-periodic occasions to transmit a second type of low power signal; and configurations for the first and second sets of occasions, wherein the first type of low power signal is for at least one of a synchronization measurement and a radio resource management (RRM) measurement; and a transceiver operably coupled to the processor, the transceiver configured to:

transmit the configurations for the first and second sets of occasions;

transmit the first type of low power signal based on the first set of periodic occasions; and transmit the second type of low power signal based on the second set of non-periodic occasions.

9. The BS of claim 8, wherein the second type of low power signal processor is used for determining whether to wake up.

10. The BS of claim 8, wherein the configurations for the first set of periodic occasions include at least one of a periodicity, an interval between consecutive occasions, and a number of occasions within the periodicity.

11. The BS of claim 8, wherein:

the configurations for the second set of non-periodic occasions include at least one of a time period and an interval between consecutive occasions, and the second set of non-periodic occasions to receive the second type of low power signal are within the time period.

12. The BS of claim 8, wherein the processor is further configured to determine a quasi-co-location (QCL) assumption for the first type of low power signal.

13. The BS of claim 12, wherein each occasion within the first set of periodic occasions is quasi-co-located (QCLed) with a synchronization signals and physical broadcast channel (SS/PBCH) block.

14. The BS of claim 13, wherein the SS/PBCH block is determined as an actually transmitted SS/PBCH block based on an indication in a system information block 1 (SIB1).

15. A method of a user equipment (UE) in a wireless communication system, the method comprising:

receiving configurations for occasions to receive first and second types of low power signals;

determining, based on the configurations:

a first set of periodic occasions to receive the first type of low power signal; and a second set of non-periodic occasions to receive the second type of low power signal;

receiving the first type of low power signal and the second type of low power signal; and performing, based on the first type of low power signal, at least one of a synchronization measurement and a radio resource management (RRM) measurement.

16. The method of claim 15 further comprising determining whether to wake up based on the second type of low power signal.

17. The method of claim 15, wherein the configurations for the occasions to receive the first type of low power signal include at least one of a periodicity, an interval between consecutive occasions, and a number of occasions within the periodicity.

18. The method of claim 15, wherein:

the configurations for the occasions to receive the second type of low power signal include at least one of a time period and an interval between consecutive occasions, and the second set of non-periodic occasions to receive the second type of low power signal are within the time period.

19. The method of claim 15 further comprising determining a quasi-co-location (QCL) assumption for receiving the first type of low power signal.

20. The method of claim 19, wherein:

each occasion within the first set of periodic occasions to receive the first type of low power signal is quasi-co-located (QCLed) with a synchronization signals and physical broadcast channel (SS/PBCH) block, and the SS/PBCH block is determined as an actually transmitted SS/PBCH block based on an indication in a system information block 1 (SIB1).

\* \* \* \* \*